United States Patent
Yang et al.

(10) Patent No.: US 11,010,630 B2
(45) Date of Patent: May 18, 2021

(54) SYSTEMS AND METHODS FOR DETECTING LANDMARK PAIRS IN IMAGES

(71) Applicants: Deshan Yang, St. Louis, MO (US); Ye Duan, Columbia, MO (US)

(72) Inventors: Deshan Yang, St. Louis, MO (US); Ye Duan, Columbia, MO (US)

(73) Assignees: Washington University, St. Louis, MO (US); The Curators of The University of Missouri, Columbia, MO (US)

(*) Notice: Subject to any disclaimer, the term of this patent is extended or adjusted under 35 U.S.C. 154(b) by 480 days.

(21) Appl. No.: 15/965,039

(22) Filed: Apr. 27, 2018

(65) Prior Publication Data

US 2018/0314906 A1    Nov. 1, 2018

Related U.S. Application Data

(60) Provisional application No. 62/490,728, filed on Apr. 27, 2017.

(51) Int. Cl.
*G06K 9/46* (2006.01)
*G06T 7/00* (2017.01)
(Continued)

(52) U.S. Cl.
CPC .......... *G06K 9/4609* (2013.01); *G06K 9/40* (2013.01); *G06K 9/44* (2013.01); *G06K 9/4671* (2013.01);
(Continued)

(58) Field of Classification Search
CPC ...... G06K 9/4609; G06K 9/6212; G06K 9/40; G06K 9/4671; G06K 9/44; G06K 2209/05;
(Continued)

(56) References Cited

U.S. PATENT DOCUMENTS 5,309,522 A * 5/1994 Dye ................... G01C 11/06
382/154
5,568,384 A * 10/1996 Robb ................... G06K 9/32
382/132

(Continued)

FOREIGN PATENT DOCUMENTS

WO    2002056241 A1    7/2002

OTHER PUBLICATIONS

Bender E.T. et al., "The utilization of consistency metrics for error analysis in deformable image registration," Physics in Medicine and Biology, 54(18): 5561-5577 (2009).
(Continued)

*Primary Examiner* — Xuemei G Chen
(74) *Attorney, Agent, or Firm* — Armstrong Teasdale LLP

(57) ABSTRACT

A computer-implemented method for detecting landmark pairs in a pair of images is provided. The method includes receiving a pair of images, sampling the pair of images to generate reduced-resolution pairs of images, identifying features in the reduced-resolution pairs of images, matching the features in the image pairs, using the matched features in an increased resolution pair of images as guides for feature matching, and through iteratively guiding feature matching, identifying landmarks in the full-resolution pair of images.

20 Claims, 24 Drawing Sheets
(18 of 24 Drawing Sheet(s) Filed in Color)

(51) Int. Cl.
  *G06T 7/33* (2017.01)
  *G06K 9/40* (2006.01)
  *G06K 9/44* (2006.01)
  *G06K 9/62* (2006.01)
  *G06T 7/246* (2017.01)

(52) U.S. Cl.
  CPC .......... *G06K 9/6212* (2013.01); *G06T 7/0016* (2013.01); *G06T 7/246* (2017.01); *G06T 7/33* (2017.01); *G06T 7/337* (2017.01); *G06K 2209/05* (2013.01); *G06T 2207/10081* (2013.01); *G06T 2207/10088* (2013.01); *G06T 2207/20016* (2013.01); *G06T 2207/20028* (2013.01)

(58) Field of Classification Search
  CPC ......... G06T 7/33; G06T 7/246; G06T 7/0016; G06T 7/337; G06T 2207/10088; G06T 2207/20016; G06T 2207/20028; G06T 2207/10081
  See application file for complete search history.

(56) References Cited

U.S. PATENT DOCUMENTS

| | | | |
|---|---|---|---|
| 6,785,427 B1* | 8/2004 | Zhou | G06T 3/4038 382/154 |
| 7,188,097 B2* | 3/2007 | Na | G06F 16/2453 707/737 |
| 7,382,897 B2* | 6/2008 | Brown | G06K 9/6203 382/103 |
| 7,949,186 B2 | 5/2011 | Grauman et al. | |
| 7,961,982 B2* | 6/2011 | Sibiryakov | G06T 7/337 382/294 |
| 8,265,356 B2 | 9/2012 | Han et al. | |
| 8,311,303 B2 | 11/2012 | Suehling et al. | |
| 8,724,926 B2* | 5/2014 | Bucki | G06T 7/30 382/294 |
| 8,798,357 B2* | 8/2014 | Sinha | G06K 9/00664 382/154 |
| 9,076,201 B1* | 7/2015 | Negahdar | G06T 7/30 |
| 9,324,003 B2 | 4/2016 | France et al. | |
| 9,478,028 B2 | 10/2016 | Parthasarathy et al. | |
| 9,530,073 B2* | 12/2016 | Hamsici | G06K 9/4671 |
| 10,217,277 B2* | 2/2019 | Robert | G06K 9/00 |
| 2003/0190091 A1* | 10/2003 | Stewart | G06T 3/0081 382/294 |
| 2006/0052686 A1* | 3/2006 | Zhang | G06T 7/32 600/407 |
| 2007/0222864 A1* | 9/2007 | Hiraga | G06T 5/003 348/208.4 |
| 2008/0205719 A1 | 8/2008 | Pekar et al. | |
| 2009/0010507 A1* | 1/2009 | Geng | G06T 7/593 382/128 |
| 2010/0080434 A1 | 4/2010 | Seifert et al. | |
| 2011/0013028 A1* | 1/2011 | Zhou | H04N 5/23248 348/208.6 |
| 2012/0154579 A1* | 6/2012 | Hampapur | G06T 7/277 348/143 |
| 2013/0083966 A1* | 4/2013 | Furukawa | G06T 7/596 382/103 |
| 2013/0211238 A1* | 8/2013 | DeCharms | A61B 5/0042 600/418 |
| 2014/0049555 A1* | 2/2014 | Bzdusek | G06T 7/0014 345/589 |
| 2014/0254882 A1* | 9/2014 | Jin | G06T 7/337 382/107 |
| 2015/0279084 A1* | 10/2015 | Deuerling-Zheng | G06T 5/50 345/424 |
| 2018/0180421 A1* | 6/2018 | Holz | G01C 21/206 |
| 2019/0318158 A1* | 10/2019 | Qin | G06K 9/00281 |
| 2019/0340772 A1* | 11/2019 | Gao | G06T 7/269 |

OTHER PUBLICATIONS

Burt, P. et al., "The Laplacian Pyramid as a Compact Image Code," IEEE Transactions on Communications, 31(4): 532-540 (1983).

Castadot, P. et al., "Comparison of 12 deformable registration strategies in adaptive radiation therapy for the treatment of head and neck tumors," Radiotherapy and Oncology, 89(1): 1-12 (2008).

Cheung, W. et al., "N-sift: N-dimensional scale invariant feature transform for matching medical images," Paper presented at 4th IEEE International Symposium on Biomedical Imaging: From Nano to Macro, pp. 720-723 (2007).

Court, L.E. et al., "Automatic online adaptive radiation therapy techniques for targets with significant shape change: a feasibility study," Physics in Medicine and Biology, 51(10): 2493-2501 (2006).

Fallone, B. G. et al., "Assessment of a commercially available automatic deformable registration system," Journal of Applied Clinical Medical Physics, 11(3): 101-123 (2010).

Fischler, M.A. et al., "Random sample consensus: a paradigm for model fitting with applications to image analysis and automated cartography," Communications of the ACM, 24(6): 381-395 (1981).

Kim, J. et al., "Intensity-based image registration using robust correlation coefficients," IEEE Transactions on Medical Imaging, 23(11): 1430-14-44 (2004).

Kim, J. et al., "A Novel Approach for Establishing Benchmark CBCT/CT Deformable Image Registrations in Prostate Cancer Radiation Therapy," International Journal of Radiation Oncology, Biology, Physics, 87(2): S713 (2013).

Klein, A. et al., "Evaluation of 14 nonlinear deformation algorithms applied to human brain MRI registration," NeuroImage, 46(3): 786-802 (2009).

Leow, A. et al., "Inverse Consistent Mapping in 3D Deformable Image Registration: Its Construction and Statistical Properties," In Biennial International Conference on Information Processing in Medical Imaging, on Information Processing in Medical Imaging, pp. 493-503 Springer, Berlin, Heidelberg (2005).

Li, S. et al., "Voxel-based statistical analysis of uncertainties associated with deformable image registration," Physics in Medicine and Biology, 58(18): 6481-6494 (2013).

Lindeberg, T. "Scale Selection Properties of Generalized Scale-Space Interest Point Detectors," Journal of Mathematical Imaging and Vision, 46(2): 177-210 (2013).

Lowe, D.G. "Object recognition from local scale-invariant features," Paper presented at The Proceedings of the Seventh IEEE International Conference on Computer Vision, vol. 2: 1150-1157, IEEE (1999).

Mazur, T. R. et al., "SIFT-based dense pixel tracking on 0.35 T cine-MR images acquired during image-guided radiation therapy with application to gating optimization," Medical Physics, 43(1): 279-293 (2016).

Mencarelli, A. et al., "Validation of deformable registration in head and neck cancer using analysis of variance," Medical Physics, 39(11): 6879-6884 (2012).

Paganelli, C. et al., "Scale invariant feature transform in adaptive radiation therapy: a tool for deformable image registration assessment and re-planning indication," Physics in Medicine and Biology, 58(2): 287-299 (2013).

Schreibmann, E. et al., "A measure to evaluate deformable registration fields in clinical settings," Journal of Applied Clinical Medical Physics, 13(5): 126-139 (2012).

Tomasi, C. et al., "Bilateral filtering for gray and color images," Paper presented at IEEE Sixth International Conference on Computer Vision, pp. 839-846, Bombay, India (Jan. 4-7, 1998).

Varadhan, R. et al., "A framework for deformable image registration validation in radiotherapy clinical applications," Journal of Applied Clinical Medical Physics, 14(1): 192-213 (2013).

Vickress, J. et al., "Automatic landmark generation for deformable image registration evaluation for 4D CT images of lung," Physics in Medicine and Biology, 61(20): 7236-7245 (2016).

Yang, D. et al., "A fast inverse consistent deformable image registration method based on symmetric optical flow computation," Physics in Medicine and Biology, 53(21): 6143-6165 (2008).

(56) References Cited

OTHER PUBLICATIONS

Zhong H. et al., "Analysis of deformable image registration accuracy using computational modeling," Medical Physics, 37(3): 970-979 (2010).

* cited by examiner

SYSTEMS AND METHODS FOR DETECTING LANDMARK PAIRS IN IMAGES

CROSS REFERENCE TO RELATED APPLICATION

This application claims the benefit of U.S. Provisional Patent Application Ser. No. 62/490,728 entitled "A METHOD TO ACCURATELY DETECT LANDMARK PAIRS IN THE IMAGES TO SUPPORT EVALUATION OF DEFORMABLE IMAGE REGISTRATION METHODS" filed on Apr. 27, 2017, the entirety of which is hereby incorporated by reference.

STATEMENT REGARDING FEDERALLY SPONSORED RESEARCH & DEVELOPMENT

This invention was made with government support under grant number HS022888 awarded by the Agency for Healthcare Research and Quality. The government has certain rights in the invention.

BACKGROUND OF THE DISCLOSURE

The field of the invention relates generally to automatic verification of deformable image registration.

Deformable image registration (DIR) is a technology used in conjunction with advanced radiotherapy techniques (e.g., adaptive radiotherapy) and other clinical tasks (e.g., target definition, automatic segmentation, motion estimation, dose accumulation, and treatment response evaluation). DIR algorithms compute tissue deformation by minimizing one or more of (a) image intensity differences, (b) irregularities of deformations, and (c) boundary mismatches of delineated structures. DIR accuracy, which is the correspondence of matching points between images under DIR, is often inadequate and largely dependent on the operator, the DIR algorithm, the implementation, and image quality. Frequently, DIR workflow (e.g., pre-DIR rigid registration, uses of region-of-interest) and parameters are manually adjusted repetitively on a trial-and-error basis before a "reasonable" result (e.g., visually acceptable) can be attained. Due to the manual inputs and visual assessments incorporated into DIR workflows, absolute accuracy may not be quantitatively assessable. Typically, the DIR algorithms quantitatively using benchmark datasets before accuracy can be assessed and before the DIR parameters can be understood and optimized by the operators.

Existing DIR evaluation methods can be classified into various categories. One method includes analyzing image intensity and deformation vector field (DVF) to assess DIR accuracy indirectly. Image intensity based metrics include the sum of squared intensity difference (SSD), mutual information (MI) and cross-correlation (CC). DVF based metrics include Jacobian, stress, inverse consistency, transverse consistency, smoothness, divergence, unbalanced stress energy. Because none of these metrics are directly related to DIR accuracy, methods based on these metrics cannot give a quantitative assessment of DIR errors (in term of mm), would fail in many cases, and cannot be trusted to support clinical decisions. Another method includes using digital phantoms with artificially generated deformation, or physical phantoms with known deformation. These methods may test the absolute DIR accuracy, but only on phantom images. The measured DIR errors for any DIR algorithm are not generalizable to patient images because the patient deformation is not known, and much more irregular and complex than the artificially generated and usually very smooth deformation. A third method includes using manually selected landmarks and manually delineated structure contours to compute a target registration error (TRE), contour displacement, or a volume overlapping ratio.

To compute a Target Registration Error (TRE) on manually selected landmarks is commonly known as the only reliable way to test DIR accuracy on a patient image dataset. However, the manual landmark selection process is very labor intensive if a relatively large number of landmarks are to be selected. For example, a lung DIR evaluation framework including a total of 6762 landmarks manually registered over the set of five thorax 4DCT image datasets requires over of 60 hours of labor. Furthermore, manually selecting landmarks can be subjective and biased. For example, human observers select the most visually apparent landmark points, e.g., the bifurcation points, in a lung CT image. However, such bifurcation points usually have very strong image gradients and therefore DIR algorithms would be naturally more accurate at such points than at image voxels with minimal image gradient. A TRE evaluated at these biasedly selected landmarks might be underestimated.

Some methods detect the landmarks automatically in CT image pairs. In one example, a method including SIFT (Scale Invariant Feature Transform) detection and matching methods yields detections of 64 landmarks per lung. On average four landmarks (or 6%) require rejection after manual verification. In another example, a method including SIFT feature detection and matching methods is used to verify the results of DIR. Between the radiation therapy simulation CT and cone-beam CT for head-neck cancer patients, on average 50 to 250 landmarks may be detected per case. The average accuracy of this landmark pair matching is 96.5% with 50% of the detected landmark pairs directed to bony structures. In another example, a method to detect SIFT features in 2D cine MRIs and compute tissue motion may track the local groups of SIFT features. In yet another example, DIR benchmark datasets of 47 pairs of temporal thoracic CT scans, 100 landmark pairs per case, may include using a customized automatic landmark detection method followed by automatic block-matching based landmark matching and manual confirmation. The method includes evaluation of the manual confirmation process, however, provides no indication as to the accuracy of the automatic feature matching prior to manual confirmation.

Current SIFT feature detection and matching methods are not mature enough to be a viable solution for automatic verification of DIR results on arbitrary patient dataset due to two correlated problems: (a) inability to detect larger number of features and (b) inability to accomplish higher feature pair matching accuracy. A density of 64 landmarks per lung, as 1 to 2 landmarks per axial slice, is inadequate to assess DIR accuracy in whole lung. Despite a high rate of feature detection and matching procedures with a matching accuracy of 94%, SIFT feature detection and matching methods cannot be fully trusted as an automatic DIR verification procedure.

The two issues are rooted in a single problem—inaccuracy in feature pair matching. A lower threshold value in the SIFT detection methods may be employed to detect tens of thousands of SIFT features in a standard size CT volume. The standard SIFT feature pair matching method, based on the feature descriptor similarity measurement, is however not optimized to accurately match the feature pairs among such a large number of features. There exists a need to accurately detect large numbers of feature pairs (e.g., landmark pairs).

BRIEF DESCRIPTION OF THE DISCLOSURE

In one aspect, a computer-implemented method for detecting landmark pairs in a pair of full-resolution images is provided. The method is implemented using at least one processor in communication with at least one memory. The method includes down-sampling, using the at least one processor, the pair of full-resolution images to generate a reduced-resolution pair of images. The reduced-resolution pair of images has an image resolution less than a corresponding resolution of the pair of full-resolution images. The method also includes detecting, using the at least one processor, a plurality of features in the reduced-resolution pair of images. The method additionally includes determining, using the at least one processor, in the reduced-resolution pair of images, a plurality of matched feature pairs in a first iteration of unguided feature matching, and at least one additional plurality of matched feature pairs in at least one additional iteration of guided feature matching with a plurality of guide pairs selected from the plurality of matched feature pairs and the at least one additional plurality of matched feature pairs. The method further includes determining, using the at least one processor, in the full-resolution pair of images, a plurality of landmark pairs in at least one iteration of guided feature matching with a plurality of guide pairs selected from the plurality of matched feature pairs and the at least one additional plurality of matched feature pairs.

In another aspect, a feature pair detection (FPD) computing device for detecting landmark pairs in a pair of full-resolution images is provided. The FPD computing device includes at least one processor in communication with at least one memory device. The at least one processor is programmed to down-sample the pair of full-resolution images to generate a reduced-resolution pair of images. The reduced-resolution pair of images has an image resolution less than a corresponding resolution of the pair of full-resolution images. The at least one processor is also programmed to detect a plurality of features in the reduced-resolution pair of images. The at least one processor is additionally programmed to determine, in the reduced-resolution pair of images, a plurality of matched feature pairs in a first iteration of unguided feature matching, and at least one additional plurality of matched feature pairs in at least one additional iteration of guided feature matching with a plurality of guide pairs selected from the plurality of matched feature pairs and the at least one additional plurality of matched feature pairs. The at least one processor is further programmed determine, in the full-resolution pair of images, a plurality of landmark pairs in at least one iteration of guided feature matching with a plurality of guide pairs selected from the plurality of matched feature pairs and the at least one additional plurality of matched feature pairs.

In an additional aspect, at least one non-transitory computer-readable storage medium having computer-executable instructions for implementing a feature pair detection (FPD) program embodied thereon is provided. When executed by an FPD computing device including at least one processor in communication with at least one memory, the computer-executable instructions cause the at least one processor to down-sample a pair of full-resolution images to generate a reduced-resolution pair of images. The reduced-resolution pair of images has an image resolution less than a corresponding resolution of the pair of full-resolution images. The computer-executable instructions also cause the at least one processor to detect a plurality of features in the reduced-resolution pair of images. The computer-executable instructions also cause the at least one processor to determine, in the reduced-resolution pair of images a plurality of matched feature pairs in a first iteration of unguided feature matching, and at least one additional plurality of matched feature pairs in at least one additional iteration of guided feature matching with a plurality of guide pairs selected from the plurality of matched feature pairs and the at least one additional plurality of matched feature pairs. The computer-executable instructions additionally cause the at least one processor to determine, in the full-resolution pair of images, a plurality of landmark pairs in at least one iteration of guided feature matching with a plurality of guide pairs selected from the plurality of matched feature pairs and the at least one additional plurality of matched feature pairs.

Advantages will become more apparent to those skilled in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure will be better understood, and features, aspects and advantages other than those set forth above will become apparent when consideration is given to the following detailed description thereof. Such detailed description makes reference to the following drawings, wherein.

Figure 1:
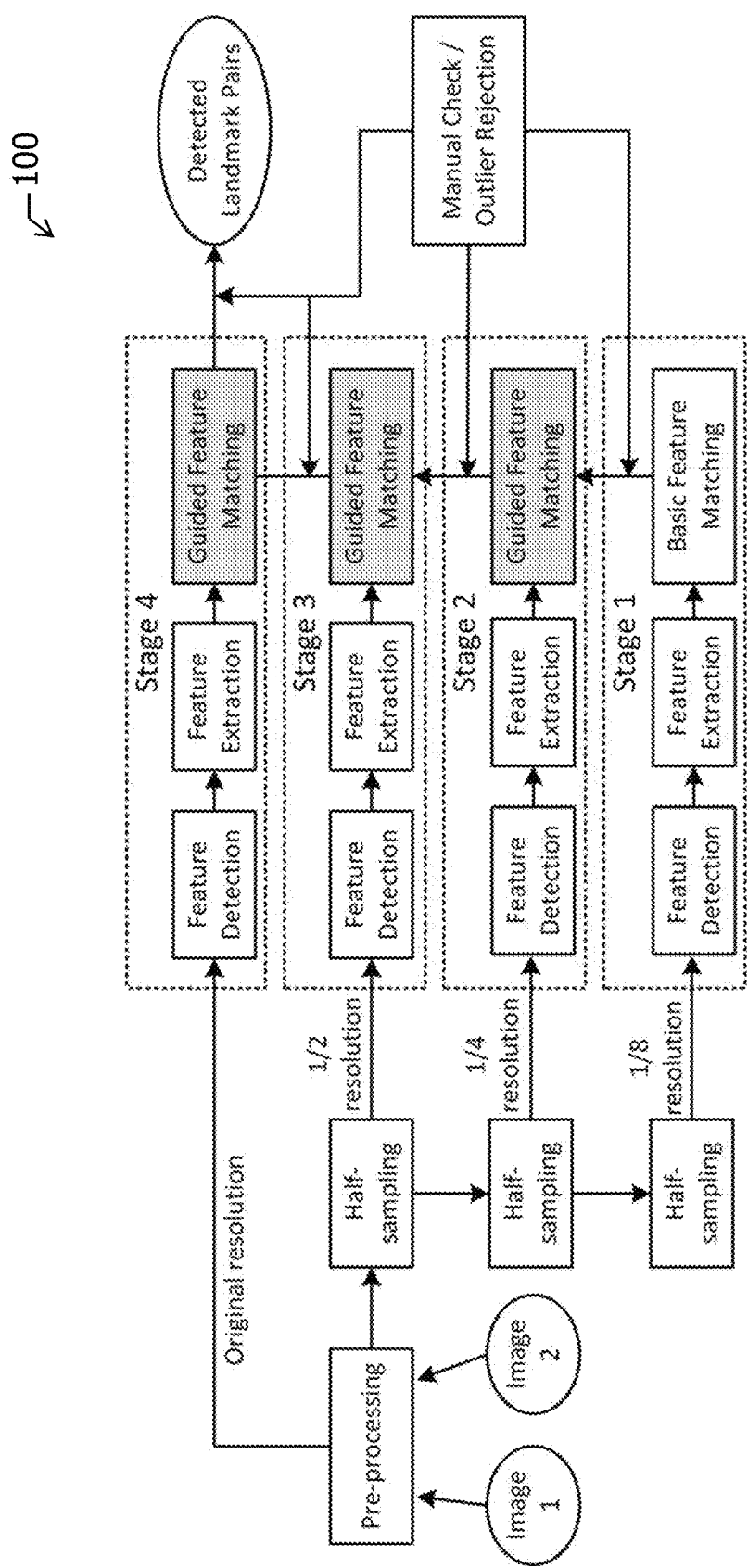
FIG. 1 is a block diagram illustrating an example process for feature pair detection.

The figures described below depict various aspects of the systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION OF THE DISCLOSURE

Unless defined otherwise, all technical and scientific terms used herein have the same meaning as commonly understood by one of ordinary skill in the art to which the disclosure belongs. Although any methods and materials similar to or equivalent to those described herein may be used in the practice or testing of the present disclosure, the preferred materials and methods are described below.

In various aspects, systems and methods for accurately detecting large numbers of feature pairs (e.g., landmark pairs) are disclosed herein. The systems and methods includes a process to perform feature detection and feature pair matching in a multiple-resolution pyramid scheme and novel inverse-consistent and guided feature matching.

The systems and methods described herein may detect feature pairs within any suitable image pair of at least a portion of a patient obtained using any suitable imaging modality without limitation in various embodiments. By way of non-limiting examples, the systems and methods described herein may detect feature pairs between the inhale and exhale phases of abdominal computed tomography (CT) scan images (e.g., 4DCT), between the original and rescanned radiation therapy simulation CT for head-neck patients, and between magnetic resonance imaging (MRI) obtained at different treatment fractions. The systems and methods described herein may detect thousands of feature pairs with a high degree of pair matching accuracy (e.g., greater than 99%). In some aspects, the systems and methods described herein may detect a feature pairs within low contrast soft tissue regions without potential bias associated with manual landmark selection. The feature pairs detected using the systems and methods described herein, after manual verification and outlier rejection, may be used as a ground-truth landmark dataset for evaluation of any deformable image registration (DIR) algorithm. In some aspects, the systems and methods may be used as a fully automated tool for verification of DIR on arbitrary patient image datasets.

FIG. 1 is a schematic diagram illustrating a method 100 of feature detection and matching. In some aspects, the method 100 includes a pre-processing step. Pre-preprocessing may include, but is not limited to, creating a skin mask, removing voxels outside the skin mask, and applying filters, including, but not limited to, a 3D bilateral filter, to remove noise from the image pair.

The method 100 includes analyzing two images using a multi-resolution inverse-consistent guided feature matching algorithm (MRICGM) which provides for accurate feature matching. Using the MRICGM algorithm, the image features are detected and matched in a multiple-resolution pyramid scheme that employs varying resolution rates. In some aspects, the multiple-resolution pyramid scheme includes applying a half-sampling rate using, for example, a Gaussian pyramid half-sampling filter. In various aspects, the MRICGM algorithm may be implemented in multiple ways. In one aspect, the matching results from each successive lower resolution stage are used to guide feature matching at each successive higher resolution stage. In this aspect, higher confidence matching is achieved at the lower resolution stage by using a tighter threshold at this stage. The results of the lower resolution stage match are used to guide additional iterations of feature matching using looser or less restrictive threshold parameters to allow more feature pairs to be matched while retaining matching accuracy.

Feature detection and feature pair matching at a lower resolution stage are more robust and accurate than the feature detection and matching steps at a higher stage, even though the locations of the detected features might be less precise. The local details in the images, which may compromise the feature detection and matching at higher resolution stages, are reduced at the lower resolution stage. In one aspect, the method 100 uses four resolution matching stages, as illustrated in FIG. 1. The image resolutions at stages 1 to 4 correspond to ⅛ (12.5%) resolution, ¼ (25%) resolution, ½ (50%) resolution and full (100%) resolution relative to the original image resolution, respectively. The 50% resolution images applied at the stage 3 are half-sampled from the full resolution stage 4 images using a Gaussian pyramid filter. The 50% resolution stage 3 images are further half-sampled for the 25% resolution stage 2 images, which are further half-sampled to obtain the 12.5% resolution stage 1 images. The resolution at each stage may be any resolution ranging from at least 1% to 100% without limitation. The reduction in resolution between successive stages may be any fractional value ranging from about 5% to about 90% without limitation. In one aspect the reduction in resolution between successive stages is about 50%, as described above, corresponding to the resolution reduction associated with common filters including, but not limited to, a Gaussian pyramid filter. The fractional reduction in resolution between successive stages may be equal for all stages, or may be different for at least a portion of the stages.

Image feature detection and matching are sequentially performed starting at the lowest resolution stage, e.g., stage 1. Matching results from each lower-resolution stage are used to guide pair matching for images with one level higher of resolution at the stage one level higher. Any number of resolution stages may be used without limitation, including at least two, at least three, at least four, at least five, or more stages. Each stage may include any number of iterations without limitation including, but not limited to, at least two, at least three, at least four, at least five, or more iterations per stage.

In various aspects, the system supports generic feature detectors and feature descriptors. In one aspect, a combination of SIFT and Harris-Laplacian corner detectors are employed to detect more feature points. In another aspect, the SIFT 3D feature descriptor was employed.

In various aspects, to detect more features in a patient image pair, a 3D SIFT feature detector and a 3D Harris-Laplacian corner detector are used. The two feature point detection methods function complementarily and detect different features by virtue of differences in each detector's algorithm. Without being limited to any particular theory, the SIFT feature detector detects local extrema of the difference of Gaussian (DOG) scale space of the 3D image. The Gaussian scale space is created by applying Gaussian smoothing repetitively on the 3D image and arranging the series of 3D smoothing results into a 4D space. DOG is calculated as the differential of the ordered smoothing results in the 4th dimension.

In one aspect, the 3D SIFT feature detector is derived from generalized SIFT feature detector configured for detection of features within 2D to N-dimensional images. In this aspect, the 3D SIFT feature detector features at least several enhancements including, but not limited to: rejecting any points outside the skin mask; iteratively refining the point position and scale in the 4D DOG space based on the 4D image gradient; rejecting the points on the edges and in the low contrast regions, based on the ratios of eigenvalues of the structural tensor matrix per point; and removing the duplicated points, defined herein as those points within 1 voxel distance from the retained points.

In one aspect, corner points in a 3D image are defined as any points having a significant intensity gradient in all 3 cardinal directions. In an aspect, a Harris algorithm detects corner points by identifying the local minima in the map of ratios between the trace and the determinant of the structural tensor matrix at every voxel, wherein the local minima points are identified according to the relation:

$$\frac{Trace^3(M)}{Det(M)} > \frac{(1+2r)^3}{r^2}$$

where M is a structural tensor matrix (at every voxel) and r is an empirical threshold assigned by a user of the algorithm.

To determine the scales (i.e. sizes in voxels) of the corner points, a series of smoothed images are created by applying Gaussian smoothing repetitively. A corner point and its scale (i.e. on one of the series of smoothed images) are selected only if the Laplacian (the 2nd order spatial derivative) of the point at the scale is greater than the Laplacians of the point at the adjacent scales.

Feature description is the process of extracting information from the voxels in the neighborhood of a feature point, processing the information and formulating the processed data into a vectorized form, i.e. the feature descriptor. The similarity between any two features could be computed as the dot-product of the two feature descriptors. In various aspects, the SIFT descriptor is used and is more robust to affine transformation and changes in illumination. In some aspects, other feature descriptors including, but not limited to, SURF and BRISK, may be implemented but may yield lower point matching accuracy and greater inverse-consistency rejection rates.

Figure 2:
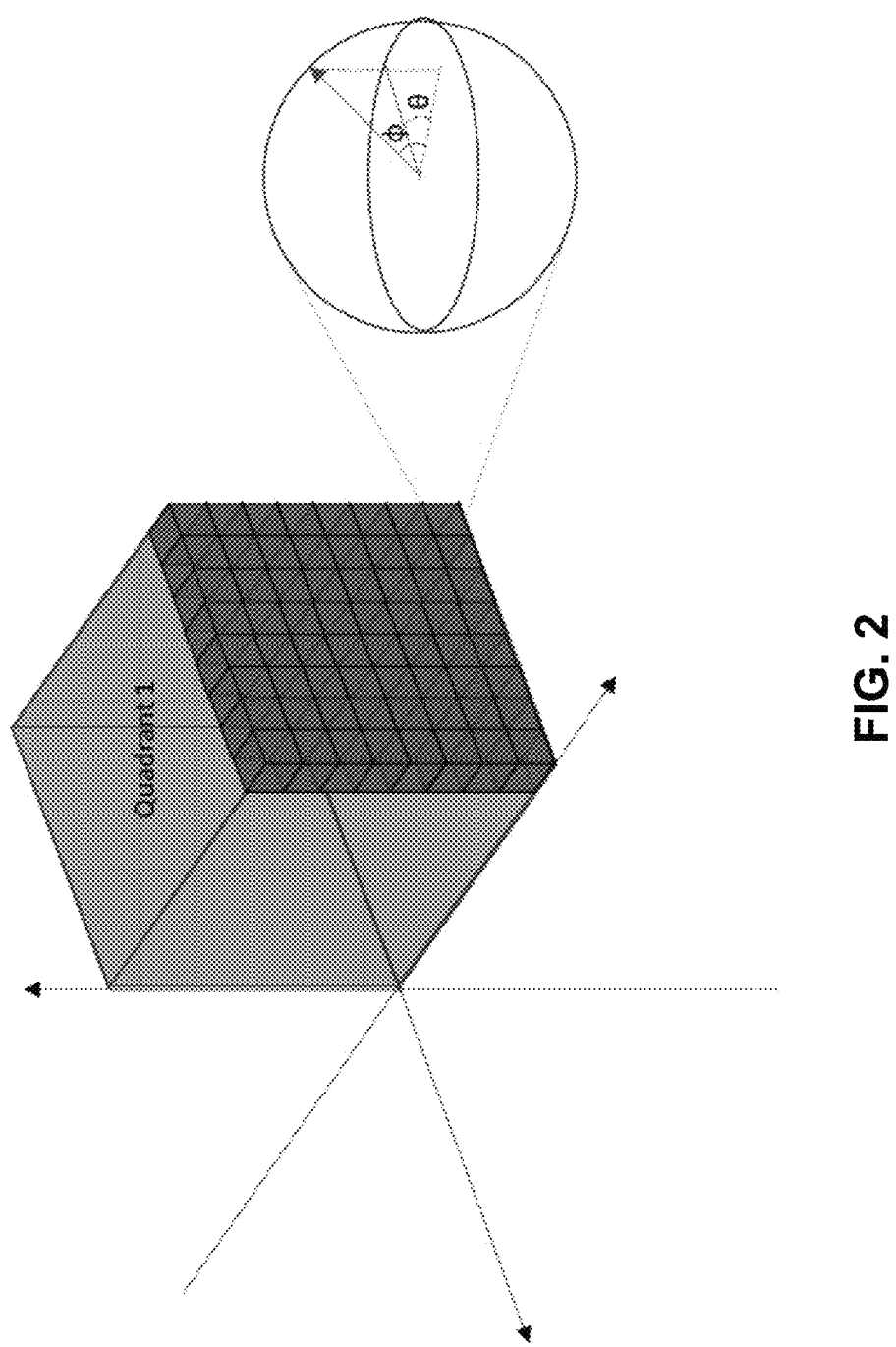
FIG. 2 is a graph illustrating one quadrant of a region split near a feature point.
Figure 3:
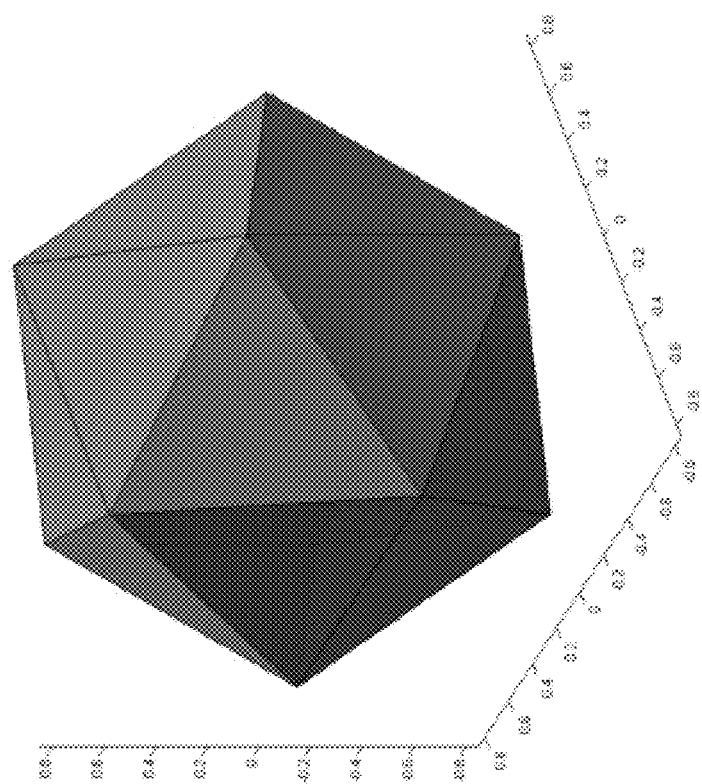
FIG. 3 is a graph illustrating a icosahedron used to define direction bins.
Figure 4:
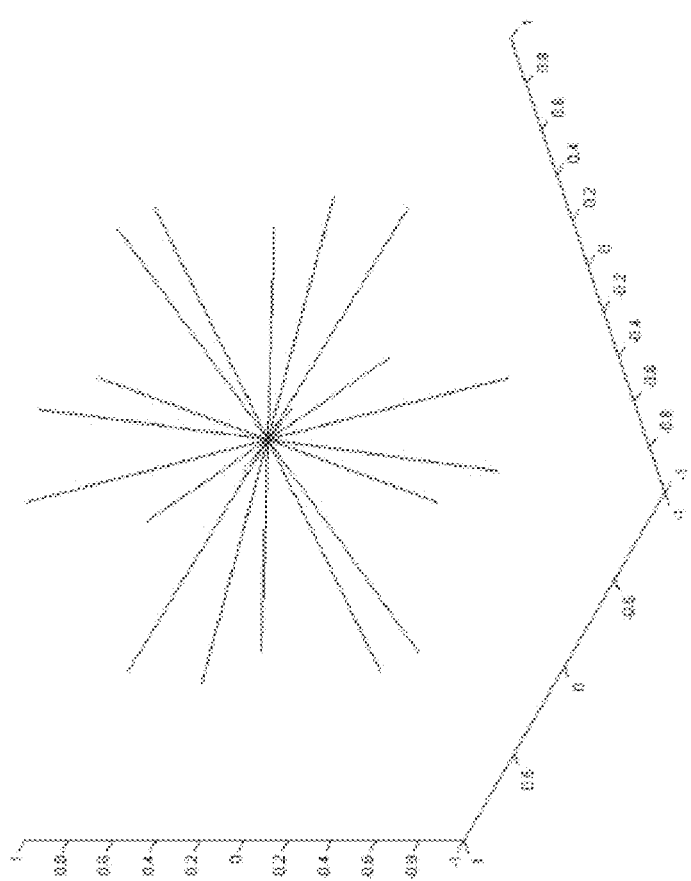
FIG. 4 is a graph illustrating normal directions of each surface of the icosahedron of FIG. 3 used as direction bins.
Figure 5A:
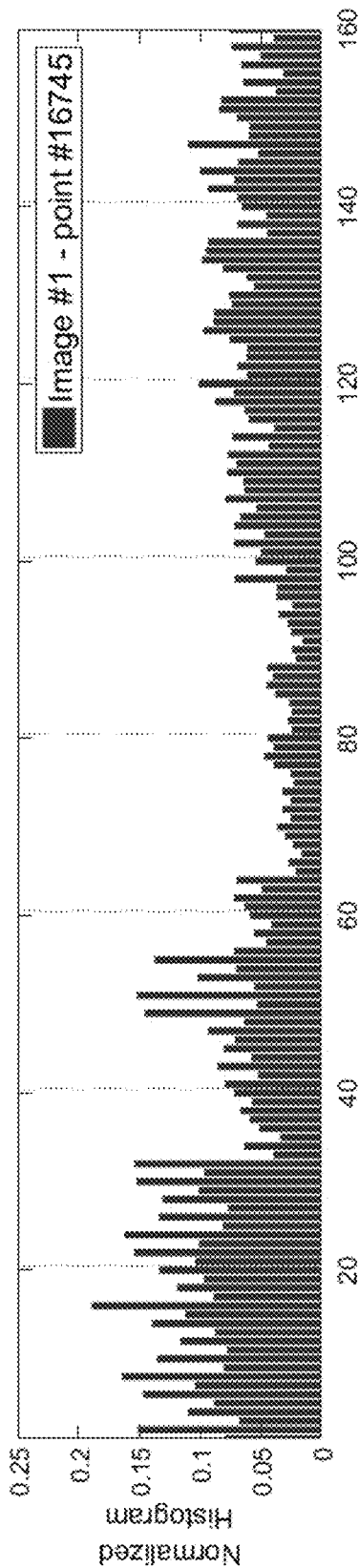
FIG. 5A is a graph illustrating a histogram of a first feature descriptor vector.
Figure 5B:
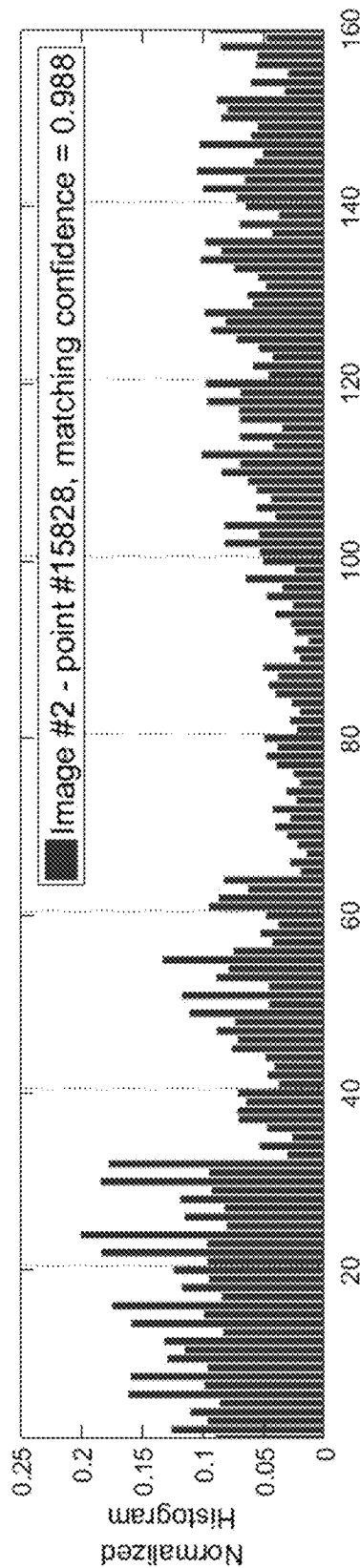
FIG. 5B is a graph illustrating a histogram of a second feature descriptor vector.

FIG. 2 illustrates a region split near a feature point in one aspect. To build a 3D SIFT descriptor at a feature point location (x, y, z) with a scale s, in some aspects, a sphere of radius $9s\sqrt{2}/2$ centered at the feature point location is considered. The sphere region is split into multiple quadrants (±x, ±y, ±z as shown in FIG. 2. For each quadrant, a histogram of a number of direction bins is built, corresponding to the associated normal directions of a geometric formation representing the bins as shown in FIG. 3 and FIG. 4. The gradient direction of each pixel is projected to a series of best-matched normal directions. In some aspects, three best-matched normal directions are selected. The gradient magnitude is projected on each of the normal directions shown in FIG. 4 and added to the value of the corresponding direction bin to generate a vector of aggregated histogram values. The vector for each image is then normalized to the unit length to become the finished feature descriptor vector. A pair of finished descriptor vectors is shown in FIG. 5A and FIG. 5B.

Feature matching is the process to identify the matching between two sets of image features that have been independently detected in two images. In some aspects, for each feature detected in one image, the second image is exclusively searched to identify the best matched feature all available features detected in the second image. A descriptor matching confidence $C_D$ between two features, i.e. a feature p in the first set and the feature q in the second set, is computed as the dot-product of two corresponding feature descriptor vectors: $C_D(p,q)=D(p) \cdot D(q)$ where D(p) and D(q) are the feature descriptors for p and q. In various aspects, $C_D$ ranges from −1, indicating a complete opposite to +1, indicating a complete match. $C_D$=0 indicates two vectors as being perpendicular to each other.

In various aspects, the regular feature matching procedure may be modified. In one aspect, two images are rigidly registered so that corresponding features are within a narrower proximal threshold. In another aspect, matching feature searching is limited to a maximal distance to reduce the total computation cost, assuming the magnitude of tissue motion between these two images is limited to certain maximal distance (e.g. 30 mm). Ambiguous matchings, for which the second best match is as good as its best match, may be discarded. In yet another aspect, a RANSAC (Random Sample Consensus) method or any variation thereof is applied after the matching procedure to reject the outliers.

In one aspect, multi-resolution guided inverse-consistent matching, or MRGICM is used for feature matching. High confidence matchings are detected first and then be used to guide the detection of additional matchings. In MRGICM, the high confidence matchings are obtained in 2 ways. Initially, feature detection and matching are implemented in a multi-resolution scheme, as shown in FIG. 1. In some aspects, multiple states may be used. In one aspect, four resolution stages are used. The stages 1 to 4 are corresponding to 100%, ½ (50%), ¼ (25%) and ⅛ (12.5%) of the original resolution. In one aspect, a Gaussian pyramid half-sampling filter is applied to down-sample a higher-resolution image to produce a lower-resolution image. Image features in the lower-resolution images are in much less quantity but each feature is more stable because the most image details are blurred out by the half-sampling process. The stable features remaining in the lower-resolution images are then matched with high confidence. In another aspect, at each given stage, feature matches are implemented in multiple iterations. Higher-confidence feature matchings are detected in an initial iteration using a tighter matching threshold. The detected higher confidence feature pairs from this initial iteration are then applied to guide the matching of additional feature pairs in subsequent iterations, and each subsequent iteration is characterized by looser and looser thresholds.

Figure 6:
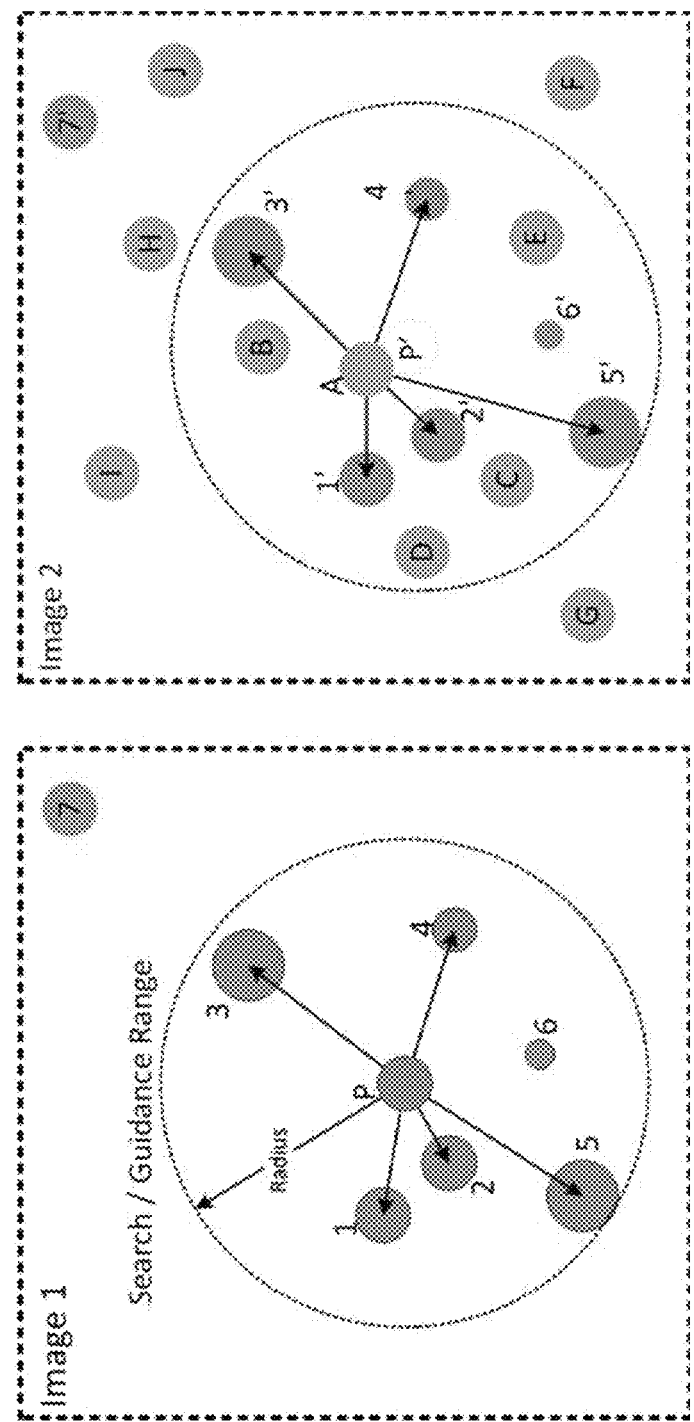
FIG. 6 is a schematic diagram illustrating guided feature matching of a first and second image.

One aspect of the guided matching procedure is illustrated in FIG. 6. An objective of the guided matching procedure is the identification of the matching feature for the point P in the first image ($I_1$) among the available points in the second image ($I_2$), if such a match exists and satisfies a minimal matching threshold. The points A to I in $I_2$ denote the available points in close proximity of P', which is the position of P mirrored to $I_2$ based on the image registration between these two images. The points 1 to 7 in $I_1$ and 1' to 7' in $I_2$ are previously-matched feature pairs with good matching confidence. As illustrated in FIG. 6, the point A is slightly off from P' in $I_2$ and the positions of the points 1 to 7 in $I_1$ and the points 1' to 7' in $I_2$ are not slightly off. For a point, e.g. the point P in $I_1$, its guidance vector V is defined as: $V'=[(X_P-X_1), (X_P-X_2), \ldots, (X_P-X_N)]$ where $V=V'/|V'|$ and $X_P, X_1, \ldots, X_N$ are the position vectors for the point P and the guidance points, and V is V' normalized to the unit length. In the aspect shown in FIG. 6, N=5 and the guidance points for P are the points 1 to 5 in $I_1$.

Similarly, for each available point in the second image, i.e. the points A to I in $I_2$, the corresponding guidance vectors can be computed for each point and the corresponding guidance points, i.e. the points 1' to 5'. By way of non-limiting example, point A and the guidance vectors between point A and the corresponding guidance points 1' to 5' are shown illustrated within the second image of FIG. 6. With the guidance vectors, the guidance confidence $C_G$ between a point p in $I_1$ and the point q in $I_2$ is computed as the dot product between two guidance vectors: $C_G(p, q)=V(p)\cdot V(q)$ where V(q) and V(q) are the guidance vectors for p and q. $C_G$ ranges between −1 (complete opposite) and 1 (complete match).

To search for the best matching point in the second image for a point in the first image, e.g. the point P, only the points in the second image within a radius from the mirrored position P' (shown as a dashed circle in FIG. 6) are checked to enhance computational efficiency. For the same reason, only previously-matched feature pairs within a radius from the point P in $I_1$ are used to construct the guidance vectors. In various aspects, the searching range and the guidance range fall within a user-defined radius of the points P and P', respectively, shown as single dashed-line circles in Image 1 and Image 2 of FIG. 6, respectively. In one aspect, the radius of the search range and the guidance range is set to 15 voxels, but may be set to any suitable voxel value by a user of the method as needed. In some aspects, the radius of the searching range for the first image and the radius of the guidance range for the second image may be the same. In other aspects, the radius of the searching range for the first image and the radius of the guidance range for the second image may be independently selected and not equal to one another.

Within the guidance radius, there may be a plurality of matched feature pairs available for use in guidance. In some aspects, the number of guidance pairs selected for use may be limited by considerations of computation efficiency. In one aspect, the maximal number of guidance feature pairs is 10. In some aspects, only those feature pairs with matching confidences of at least 0.95 are used for guidance to enhance the quality of guidance. If less than a specified maximum number of matched and qualified feature pairs are available for use in the guidance range, all matched and qualified feature pairs are used. If there are more than the specified maximum number of matched and qualified feature pairs, the pairs of the best matching confidence will be selected for use up to the specified maximum number. If no matched pairs were detected within the guidance range for a given point, feature matching will be performed using alternative methods, including, but not limited to identifying the best feature match based solely on feature descriptors, without additional guidance from previously-match and qualified feature pairs.

For each point P in $I_1$, to find the best matching point in $I_2$ within the searching range of the mirrored position P' under the guidance of feature pairs 1 to 5, the overall matching confidence is computed for all the candidates. The combined confidence for a point p in $I_1$ and the point q in $I_2$ is defined as:

$$C(p, q) = \frac{C_D(p, q) + \alpha C_G(p, q)}{1 + \alpha}$$

where $\alpha$ is an arbitrary ratio to weight the contributions between the descriptor matching confidence and the guidance confidence. In one aspect, an $\alpha$ of 0.66 is used.

In various aspects, after confidence values are computed for all matching candidates, the best matching candidate is identified using at least one matching criteria including, but not limited to: best combined matching confidence; descriptor matching confidence greater than a descriptor matching threshold $t_1$; guidance matching confidence greater than a guidance matching threshold $t_2$. In one aspect, if more than one matching candidate exists, the best matching candidate may be selected such that the ratio of the combined confidences of the best and the second best candidate is greater than a threshold $t_3$.

In some aspects, feature matching between two sets of features is performed bi-directionally. In some aspects, an inverse consistent matching may enhance the accuracy of matching as compared to the unidirectional matching as described above. In one aspect, a simple inverse-consistent matching strategy is used. For each feature in the first feature set, e.g. P in $I_1$, a best matching candidate A in $I_2$ is identified in the second feature set in a forward-matching phase. In this aspect, a best matching point in $I_1$ is then identified for the previously-identified best matching candidate A in $I_2$ using the matching procedure described above, but with the first and second images reversed in a reverse-matching phase. In this aspect, the candidate matched feature pair P and A is confirmed if each of the two feature points are corresponding best matching points for both the forward and reverse matching phases. If the forward and reverse matching phases fail to identify the same matched feature pair, the matching is classified ambiguous and is rejected.

Figure 7:
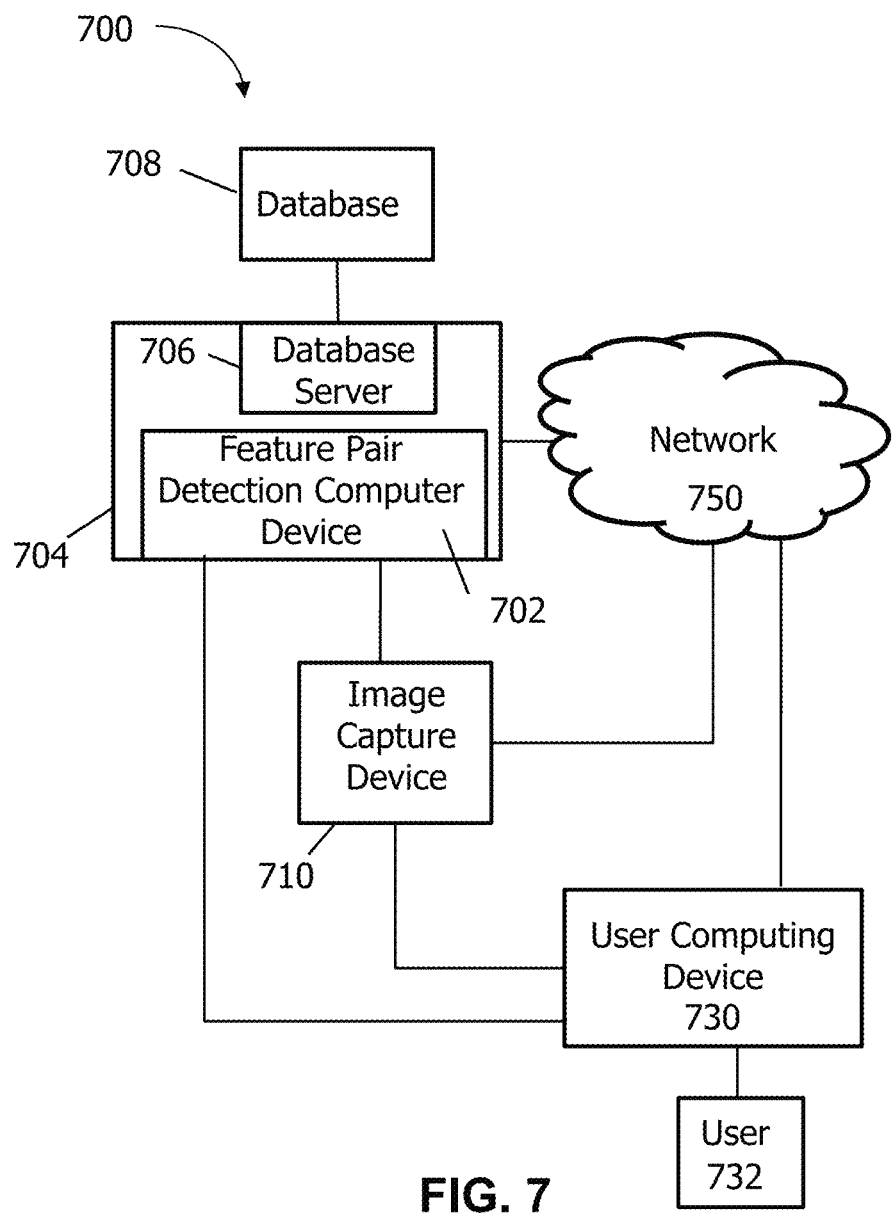
FIG. 7 is a block diagram showing elements of a computing system used for tracking a shape of an object depicted in a video.

In various aspects, the feature pair detection methods described above may be implemented on a computer device and/or computer system as described below. FIG. 7 illustrates a feature pair detection (FPD) computer system 700 that may be implemented in a medical setting in one aspect. As illustrated in FIG. 7, the FPD computer system 700 includes an FPD computer device 702. In one aspect, the FPD computer device 702 is part of a server system 704. The server system 704 includes a database server 706 in communication with a database 708. In some aspects the server system 704 includes the database 708.

The server system 704 may be in communication with an image capture device 710 through a network 750 or in some aspects, the server system 704 may be in direct communication with the image capture device 710. The FPD computer system 700 also includes a user computing device 730 which is in communication with server system 704. A user 732 may perform various functions on the server system 704 through the network 750 using the user computing device 730. In some aspects, a user 732 using user computing device 730 is also in communication with the image capture device 710 and/or controls the image capture device 710.

The network 750 may be any network that allows local area or wide area communication between devices. For example, the network 750 may allow communicative coupling to the Internet through many interfaces including, but not limited to, at least one of a network including, but not limited to, the Internet, a local area network (LAN), a wide area network (WAN), or an integrated services digital network (ISDN), a dial-up-connection, a digital subscriber line (DSL), a cellular phone connection, and a cable modem. User computing device 730 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Figure 8:
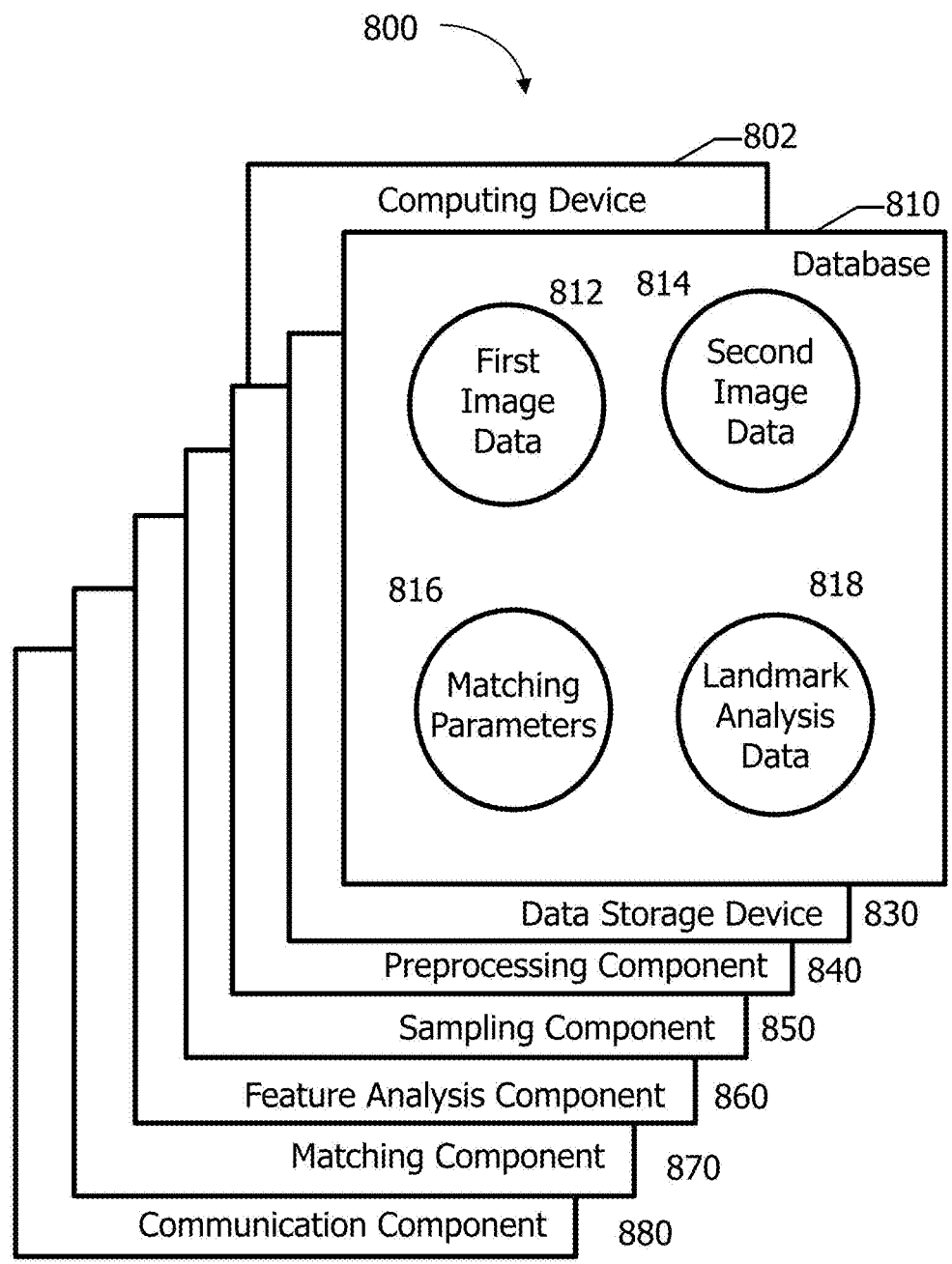
FIG. 8 is a block diagram of components of a computing device in accordance with one aspect of the disclosure.

FIG. 8 depicts a component configuration 800 of a computing device 802, which includes a database 810 along with other related computing components. In some aspects, the computing device 802 is similar to the FPD computing device 702 (shown in FIG. 7) and may be used to identify landmark pairs in a pair of images. A user 732 (shown in FIG. 7) may access components of the computing device 802. In some aspects, the database 810 is similar to database 708 (shown in FIG. 7).

In the example aspect, database 810 includes first image data 812, second image data 814, matching parameters 816, and landmark analysis data 818. The first image data 812 includes, but is not limited to, image data received from a magnetic resonance image (MRI) machine, a computed tomography (CT) scan, any other suitable medical imaging device, or any other suitable image capture device without limitation. In some aspects, the FPD computing device 702 may receive real-time or nearly real-time image data 812/814 obtained from a subject using the image capture device 710 and previously-obtained historical image data from any number of image capture devices and/or scanners. The second image data 814 includes substantially the same image data as the first image data 812. In some aspects the second image data 814 includes data in a time-delayed state including, but not limited to, changes in movement of the captured subject. By way of non-limiting example, the first image data 812 and the second image data 814 may be images of a subject at two different phases of a respiratory cycle, such as an end-of-inhale phase and at an end-of-exhale phase. Matching parameters 816 may be any parameters related to implementation of the disclosed method and may include, but are not limited to, the resolution of the image pair and the sampling rate. In one aspect, matching parameters 816 may include any one or more of the parameters and values as described in Table 1 below. Landmark analysis data 818 is used in the analysis of images, and may include but is not limited to, identified feature sets.

TABLE 1

Parameter values used by SIFT and Harris-Laplacian algorithms

| Method | Parameters | Values |
| --- | --- | --- |
| SIFT feature detection | Threshold | 0.01 |
| | Gaussian scale space length | 6 |
| | Gaussian kernel σ | [1, 1.15, 1.32, 1.52, 1.74, 2] |
| | Octaves | 1 |
| | Number of iterations in point location refinement | 25 |
| | Duplication removal distance threshold | 1 voxel |
| Harris-Laplacian corner detection | Threshold parameter r | 10 |
| | Number of Gaussian smoothing steps | 5 |
| | Gaussian kernel σ | [1, 1.26, 1.59, 2, 2.52] |
| SIFT feature descriptor | Number of histogram bins per quadrant | 20 |
| | Number of quadrants in 3D | 8 |
| MRGICM (Multi-Resolution Guided Inverse-Consistent Matching) | Number of multi-resolution stages | 4 |
| | Maximal number of guidance feature pairs | 10 |
| | Range to select guidance feature pairs | 15 voxels |
| | Range to search for matching points | 15 voxels |
| | Number of iterations per stage | 2 (for stages 2 to 4) and 5 for stage 1 |
| | Descriptor matching threshold $t_1$ for stages 1 to 3 | 0.2, 0.3 (2 iterations) |
| | Guidance matching threshold $t_2$ for stage 1 to 3 | 0.2, 0.3 (2 iterations) |
| | Descriptor matching threshold $t_1$ for stage 4 | 0.2, 0.3, 0.4, 0.5 and 0.5 (5 iterations) |
| | Guidance matching threshold $t_2$ for stage 4 | 0.2, 0.2, 0.2, 0.2 and 0.3 (5 iterations) |
| | Ratio between the 1stand 2ndbest overall confidences | 1.11 |
| | Minimal matching confidence for a matched feature pair to be used for guidance | 0.95 |
| Standard feature matching method | Range to search for matching points | 20 mm |
| | Ratio between the $1^{st}$ and 2nd best overall confidences | 1.11 |
| | Descriptor matching threshold $t_1$ | Adjustable[a] |

[a]The descriptor matching threshold is adjustable for the standard feature matching method to control the total number of detected feature pairs.

Referring again to FIG. 8, the computing device 802 also includes a plurality of components, and each component is configured to perform one or more specific tasks associated with the disclosed method. In one aspect, the computing device 802 includes a data storage device 830, a preprocessing component 840, a sampling component 850, a feature analysis component 860, a matching component 870, and a communications component 880. The data storage device 830 is configured to store data received or generated by the computing device 802, including, but not limited to, any of the data stored in database 810 or any outputs of processes implemented by any component of computing device 802. In some aspects, the data storage device 830 stores the identified feature landmarks obtained using the feature analysis component 860. The preprocessing component 840 is configured to process the images received from the database 810 including, but not limited to, cropping and filtering the received image data 812/814. In some aspects, the matching parameters 816 are stored in the database 810 or the data storage device 830. The sampling component 850 is configured to incrementally and/or iteratively modify the resolution of the received images as described above. In one aspect, the sampling component 850 reduces the resolution of the image pair in incremental down-sampling steps as shown in FIG. 1.

Referring again to FIG. 8, the feature analysis component 860 is configured to analyze the first and second image data 812/814 encoding the image pair to identify feature landmarks in the images as described above. In some aspects, the feature analysis component 860 determines feature descriptors as described above. In various aspects, the matching component 870 is configured to match features between a pair of images. In other aspects, the communications component 880 is configured to enable communications between the computing device 802 and other computing devices (e.g. the user computing device 730 shown in FIG. 7) over a network including, but not limited to, the network 750 (shown in FIG. 7), or a plurality of network connections using predefined network protocols including, but not limited to, TCP/IP (Transmission Control Protocol/Internet Protocol).

Figure 9:
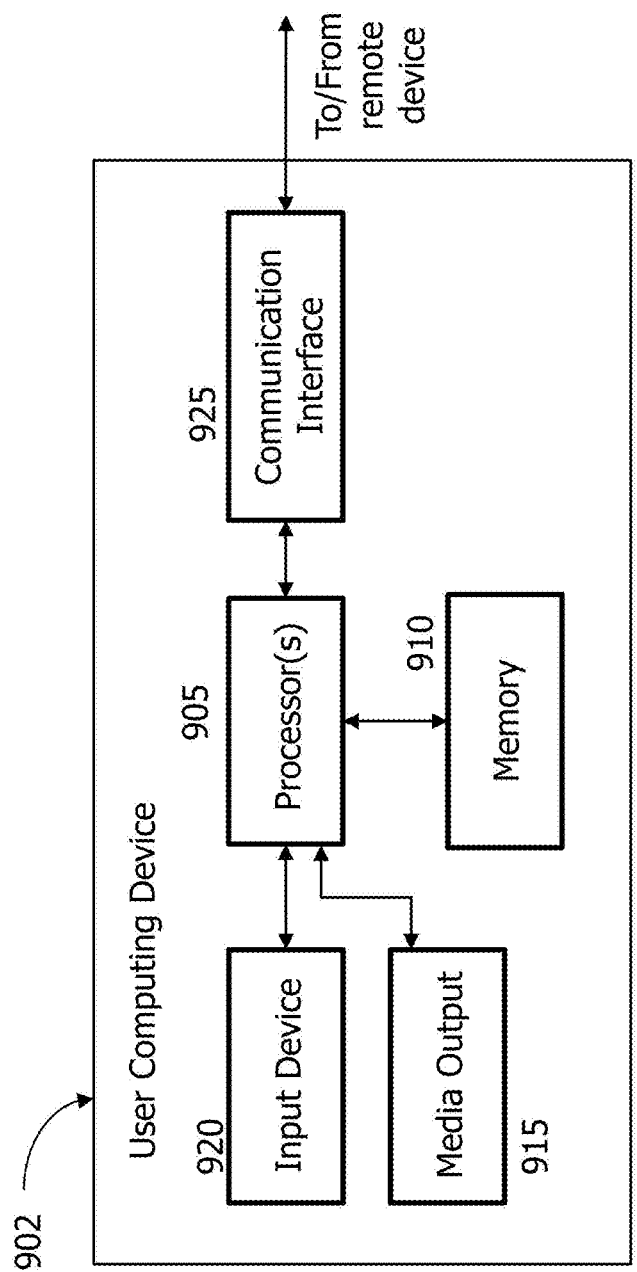
FIG. 9 is a block diagram illustrating an arrangement of components of a user computing device for use in the computing system shown in FIG. 7.

FIG. 9 depicts a configuration of a remote or user computing device 902, such as the user computing device 730 (shown in FIG. 7). In one aspect, the computing device 902 includes a processor 905 for executing instructions. In some aspects, executable instructions are stored in a memory area 910. The processor 905 may include one or more processing units (e.g., in a multi-core configuration). A memory area 910 may be any device allowing information including, but not limited to, executable instructions and/or other data to be stored and retrieved. The memory area 910 may also include one or more computer-readable media.

The computing device 902 also includes at least one media output component 915 for presenting information to the user 732 (shown in FIG. 7). The media output component 915 may be any suitable component capable of conveying information to the user 732. In some aspects, the media output component 915 includes an output adapter including, but not limited to, a video adapter and/or an audio adapter. An output adapter may be operatively coupled to processor 905 and operatively coupleable to any suitable output device including, but not limited to, a display device (e.g., a liquid crystal display (LCD), organic light emitting diode (OLED) display, cathode ray tube (CRT), or "electronic ink" display) or an audio output device (e.g., a speaker or headphones). In some aspects, the media output component 915 is configured to present an interactive user interface (e.g., a web browser or client application) including, but not limited to, a graphical user interface (GUI) to the user 732.

In some aspects, the computing device 902 includes an input device 920 for receiving input from the user 732. The input device 920 includes, for example, a keyboard, a pointing device, a mouse, a stylus, a touch sensitive panel (e.g., a touch pad or a touch screen), a camera, a gyroscope, an accelerometer, a position detector, and/or an audio input device. In some aspects, a single component including, but not limited to, a touch screen, functions as both the output device of the media output component 915 and the input device 920.

In some aspects, the computing device 902 also includes a communication interface 925, which may be communicatively coupleable to a remote device. The communication interface 925 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

In some aspects, computer-readable instructions are stored in the memory area 910 for providing a user interface to the user 732 via the media output component 915 and, optionally, receiving and processing input from the input device 920. A user interface may include, among other possibilities, a web browser and client application. Web browsers enable the user 732 to view and interact with media and other information typically embedded on a web page or a website from a web server. In some aspects, a client application allows users to interact with a server application associated with a vendor, health facility, or related businesses.

Figure 10:
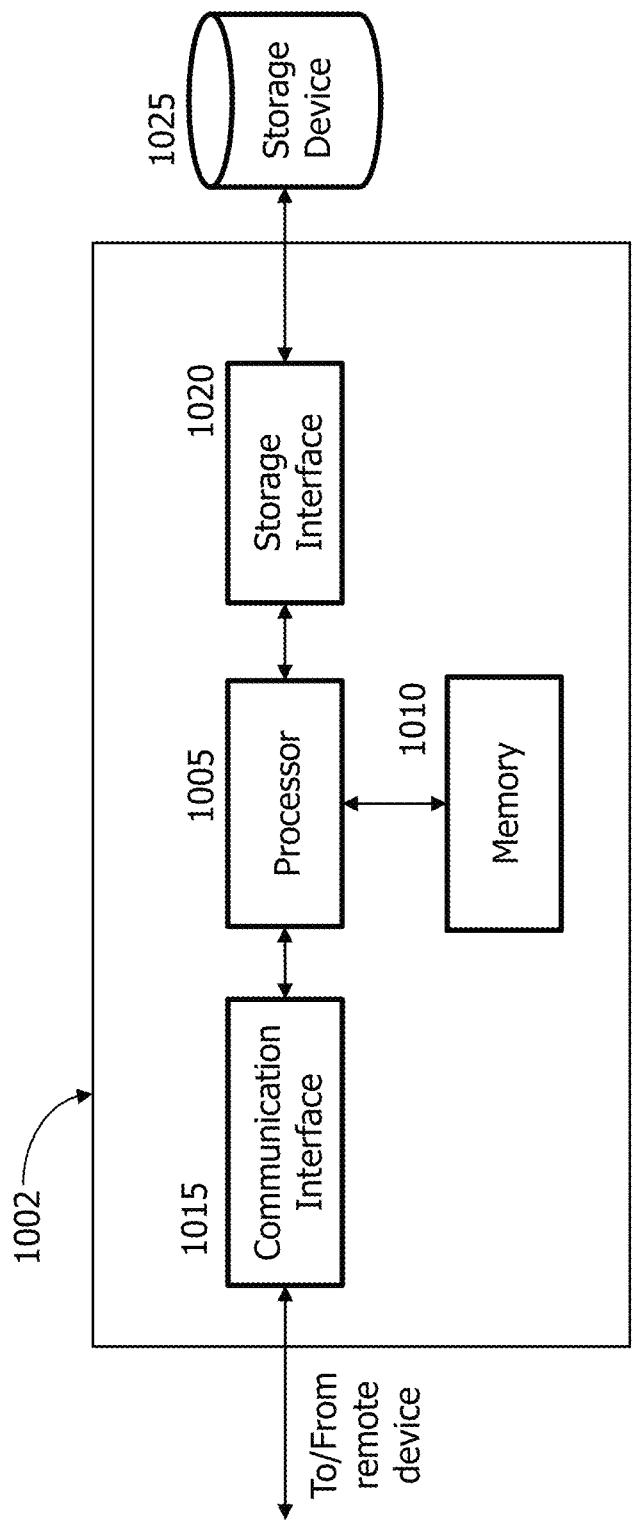
FIG. 10 illustrates is a block diagram illustrating an arrangement of components of a server system for use in the system shown in FIG. 7.

FIG. 10 illustrates a configuration of a server system 1002 in one aspect. The server system 1002 may include, but is not limited to, the database server 706 and the FPD computing device 702 (both shown in FIG. 7). In some aspects, the server system 1002 is similar to the server system 704 shown in FIG. 7. The server system 1002 may further include a processor 1005 for executing instructions. Instructions may be stored in a memory area 1010 in one aspect. In various aspects, the processor 1005 may include one or more processing units (e.g., in a multi-core configuration).

In one aspect, the processor 1005 is operatively coupled to a communication interface 1015 such that the server system 1002 is capable of communicating with a remote device including, but not limited to, the user computing device 730 shown in FIG. 7 or another server system 1002. In some aspects, the communication interface 1015 is configured to receive requests from the user computing device 730 via a network 750 as shown in FIG. 7.

In some aspects, the processor 1005 is operatively coupled to a storage device 1025. The storage device 1025 may be any computer-operated hardware suitable for storing and/or retrieving data. In some aspects, storage device 1025 is integrated into the server system 1002. In some aspects, the server system 1002 includes one or more hard disk drive as storage device 1025. In other aspects, the storage device 1025 is external to the server system 1002 and is accessed by a plurality of server systems 1002. In some aspects, the storage device 1025 includes multiple storage units including, but not limited to, hard disks or solid state disks in a redundant array of inexpensive disks (RAID) configuration. In some aspects, the storage device 1025 includes a storage area network (SAN) and/or a network attached storage (NAS) system.

In some aspects, the processor 1005 is operatively coupled to the storage device 1025 via a storage interface 1020. The storage interface 1020 may be any component capable of providing the processor 1005 with access to storage device 1025. In some aspects, the storage interface 1020 includes any type of communications device including, but not limited to, an Advanced Technology Attachment (ATA) adapter, a Serial ATA (SATA) adapter, a Small Computer System Interface (SCSI) adapter, a RAID controller, a SAN adapter, a network adapter, and/or any other suitable component capable of providing the processor 1005 with access to the storage device 1025.

The memory 910 of the user computing device 902 shown in FIG. 9 and the memory 1010 of the server system 1002 shown in FIG. 10 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory devices are provided as examples only, and are thus not limiting as to the types of memory devices suitable for storage of a computer program or application.

Figure 11:
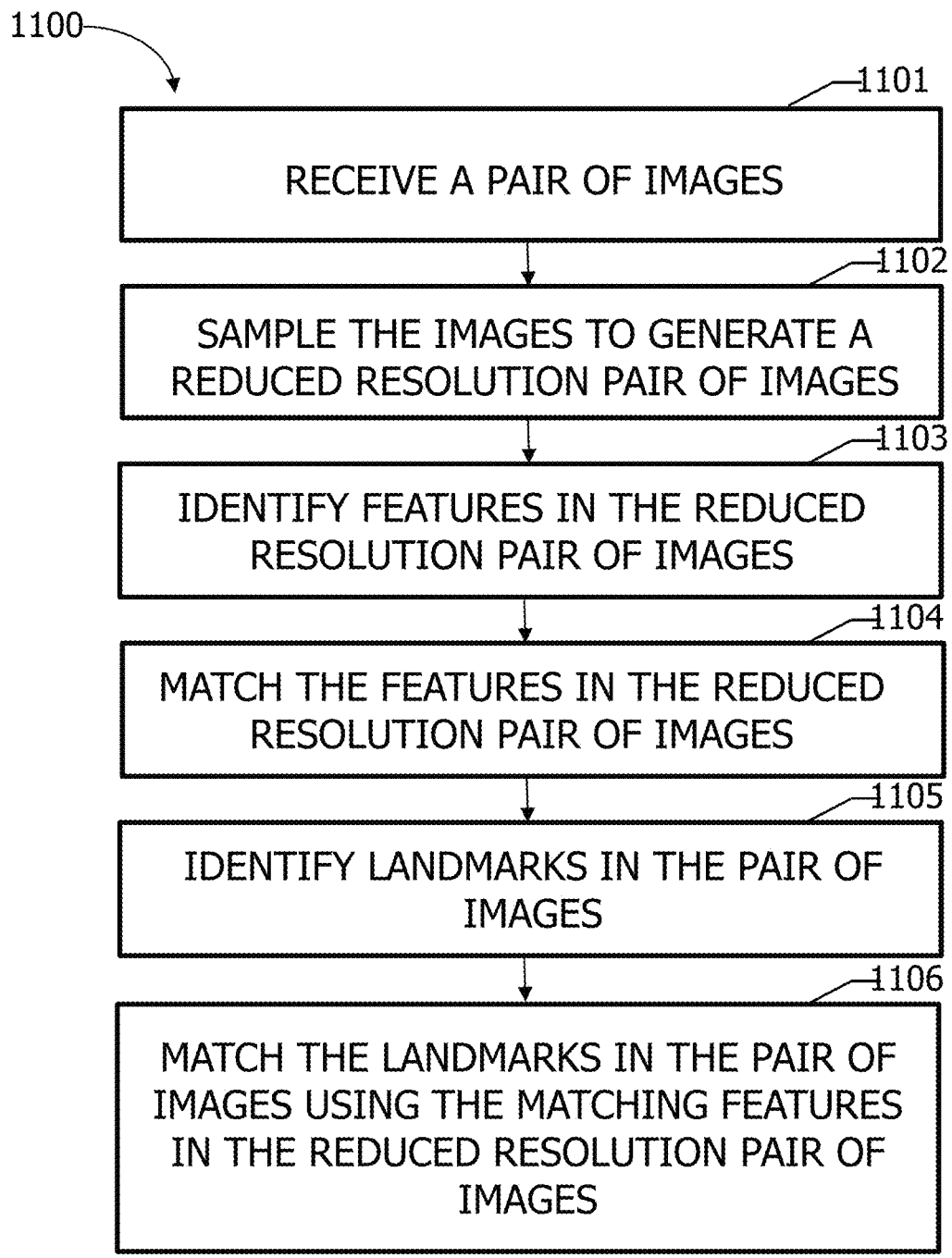
FIG. 11 is a flowchart summarizing a method for feature pair detection.

FIG. 11 is a block diagram illustrating a computer-implemented method 1100 for feature pair detection using the FPD computer device shown in FIG. 7. In some aspects, the computer-implemented method 1100 includes receiving a pair of images at 1101, sampling the pair of images to generate a reduced-resolution pair of images at 1102, identifying features in the reduced-resolution pair of images at 1103, matching the features in the reduced-resolution pair of images at 1104, identifying landmarks in the pair of images at 1105, and, matching the landmarks in the pair of images using the matching features in the reduced-resolution pair of images at 1106.

Figure 12:
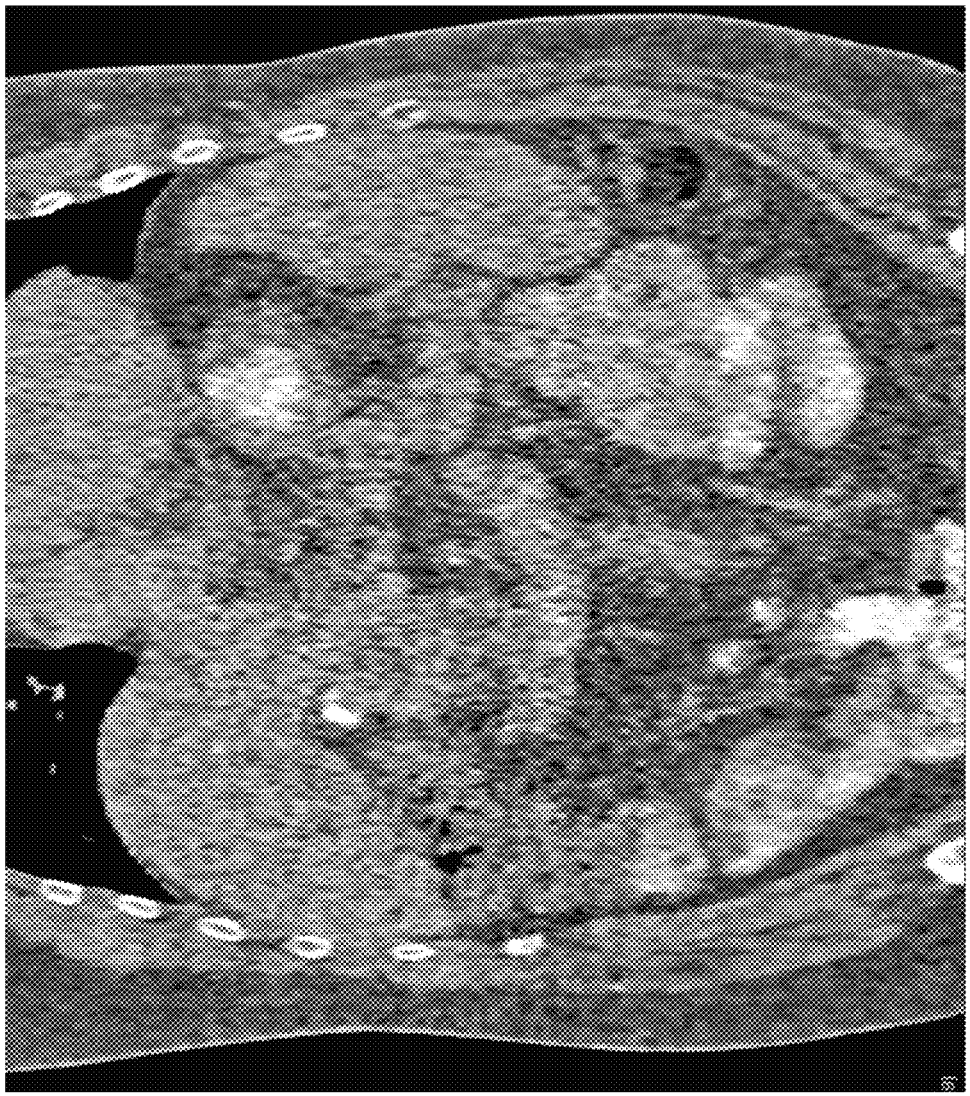
FIG. 12 is an image illustrating a subject coronal view image obtained at an end-of-inhale phase.
Figure 13:
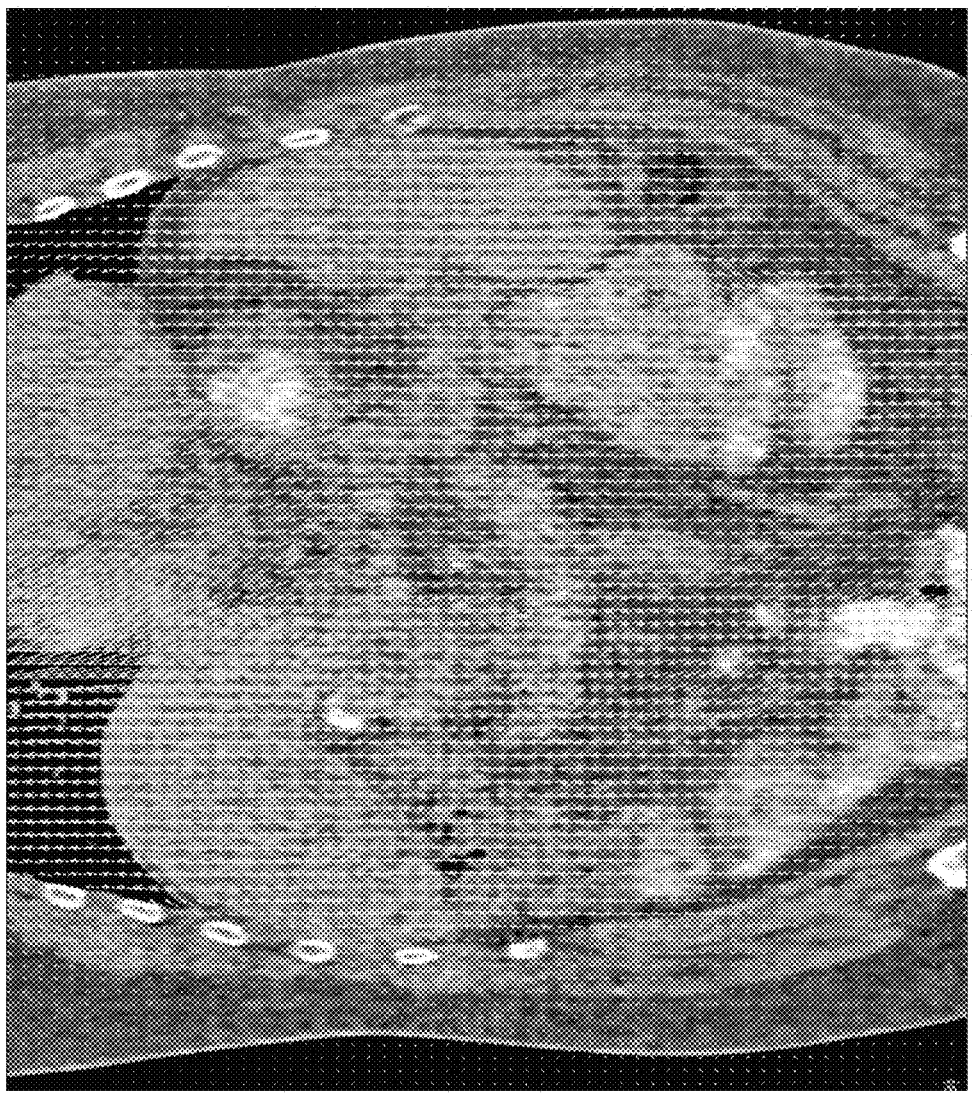
FIG. 13 is an image illustrating the subject coronal view image of FIG. 12 with a computed deformation vector field.
Figure 14:
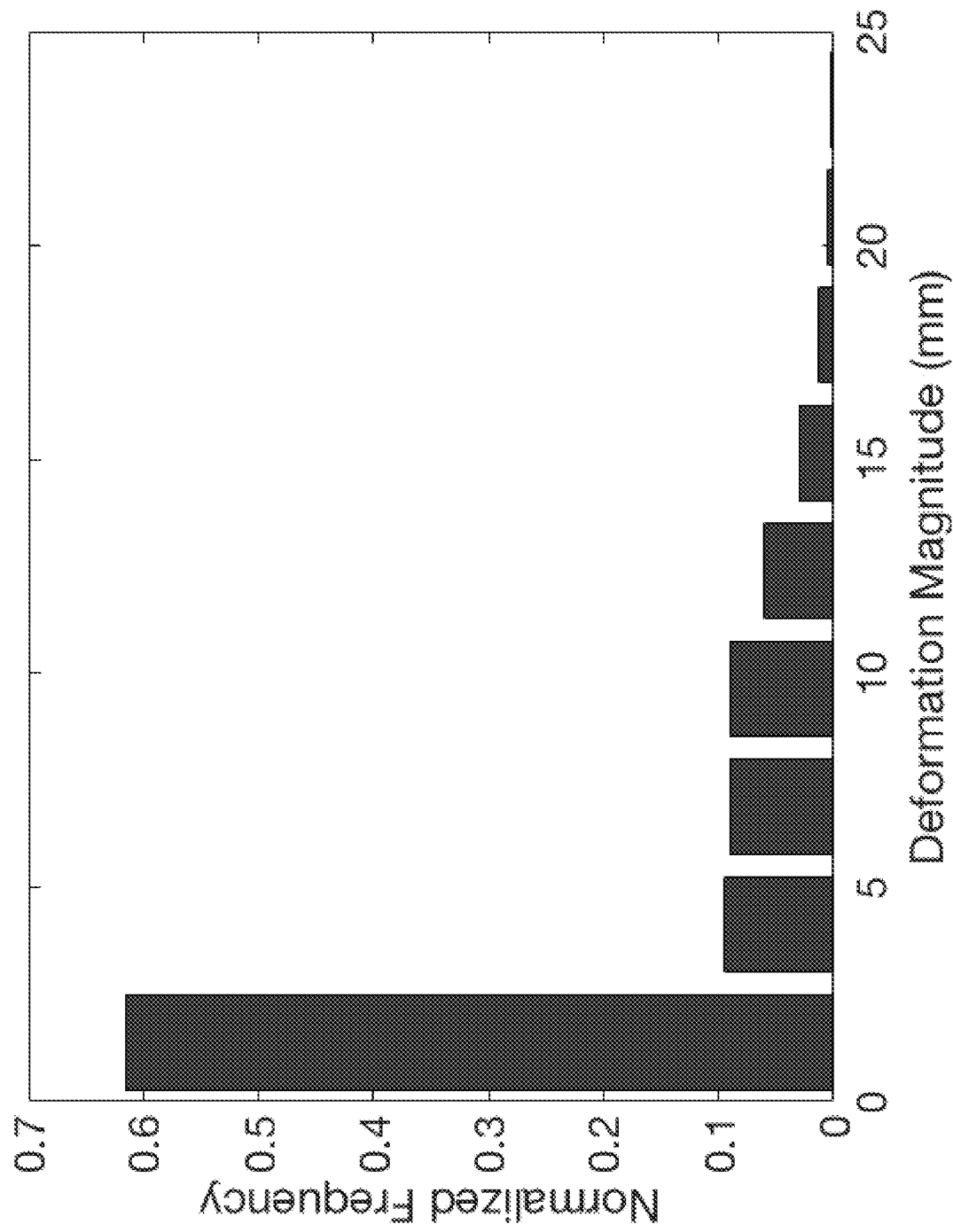
FIG. 14 is a graph illustrating a histogram of magnitude of a computed deformation vector field.
Figure 15:
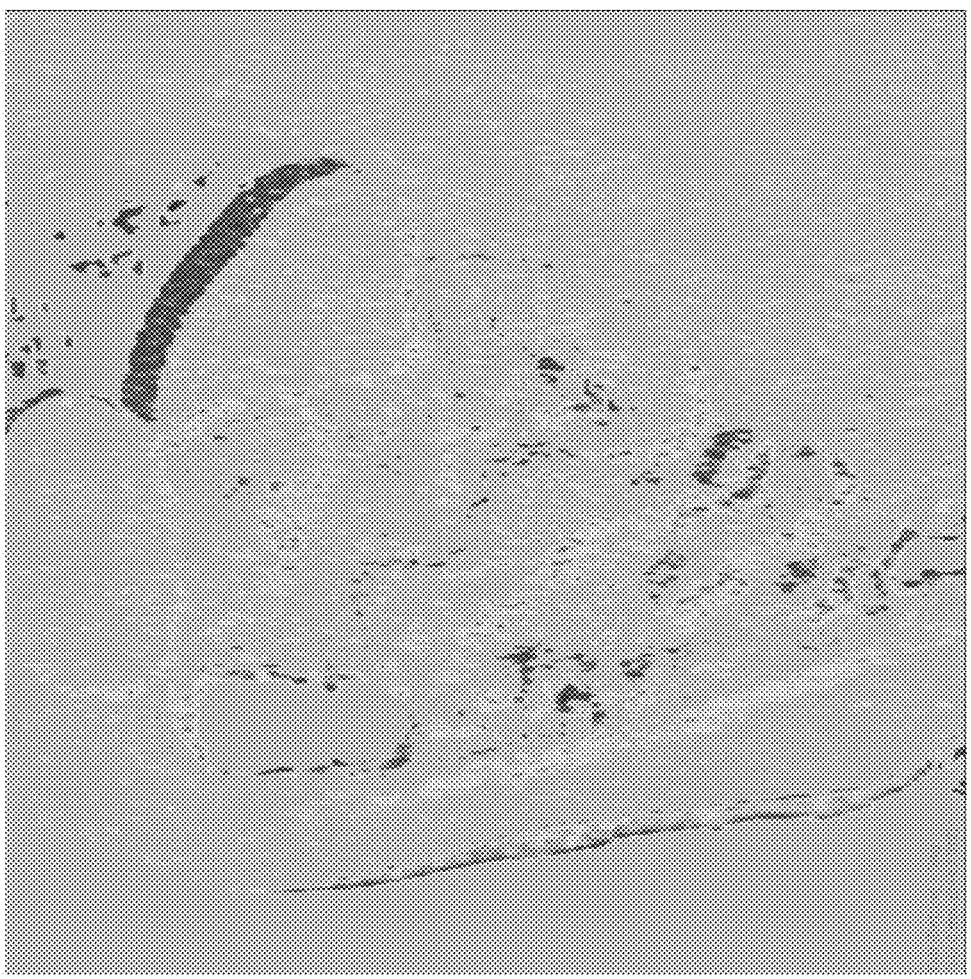
FIG. 15 is an image containing a sagittal view of a map of a difference between an end-of-exhale phase and an end-of-inhale phase.
Figure 16:
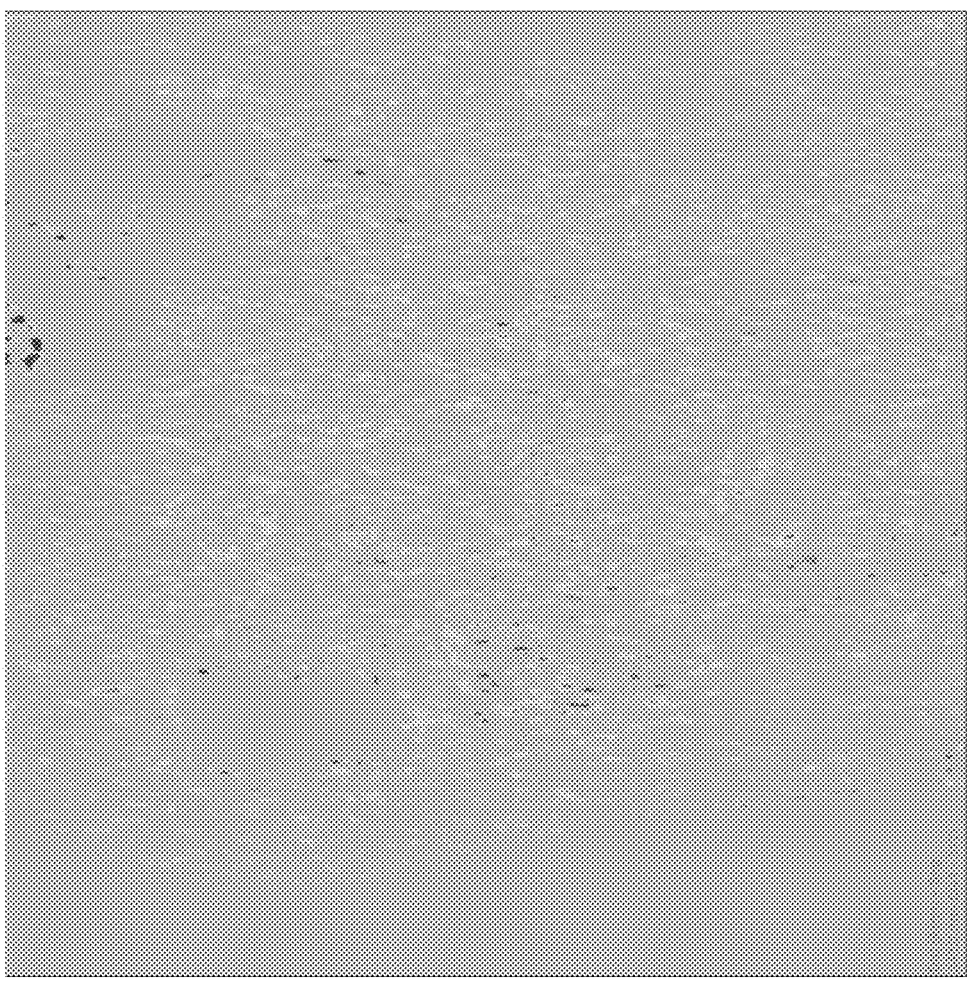
FIG. 16 is an image containing a sagittal view of a map of a difference between an end-of-exhale phase and a deformed end-of-inhale phase.
Figure 17:
FIG. 17 is an image containing a subject coronal view image obtained at an end-of-inhale phase overlaid with a computed deformation vector field.

In some aspects, image pairs consist of separate stages of medical evaluation and diagnoses. By way of non-limiting example, the first image may be a coronal view of a 4DCT abdominal image obtained at the end-of-inhale (EI) phase of the respiratory cycle as shown in FIG. 12. In this example, the second image of the image pair may be a similar image as the first image obtained at the end-of-exhale (EE) phase of the respiratory cycle. A deformation vector field (DVF) may be computed between the EI and the EE phase and superimposed on the EI image as shown in FIG. 13. A DVF magnitude histogram as shown in FIG. 14 may generated based on the vectors of the DVF map shown in FIG. 13. In addition, difference images may be calculated as shown in FIG. 15 and FIG. 16. FIG. 15 is a difference image obtained from changes between sagittal 4DCT abdominal images obtained at EE (second image) and obtained at EI (first image). FIG. 16 is a difference image obtained from changes between the same sagittal 4DCT abdominal images used to obtain the difference image of FIG. 15, except that the EI image was deformed according to the calculated DVF illustrated in FIG. 17. FIG. 17 illustrates the sagittal 4DCT abdominal image obtained at EI phase overlaid with the computed DVF.

Figure 20:
FIG. 20 is a pair of axial view images with detected feature pairs overlaid onto each image.
Figure 20:
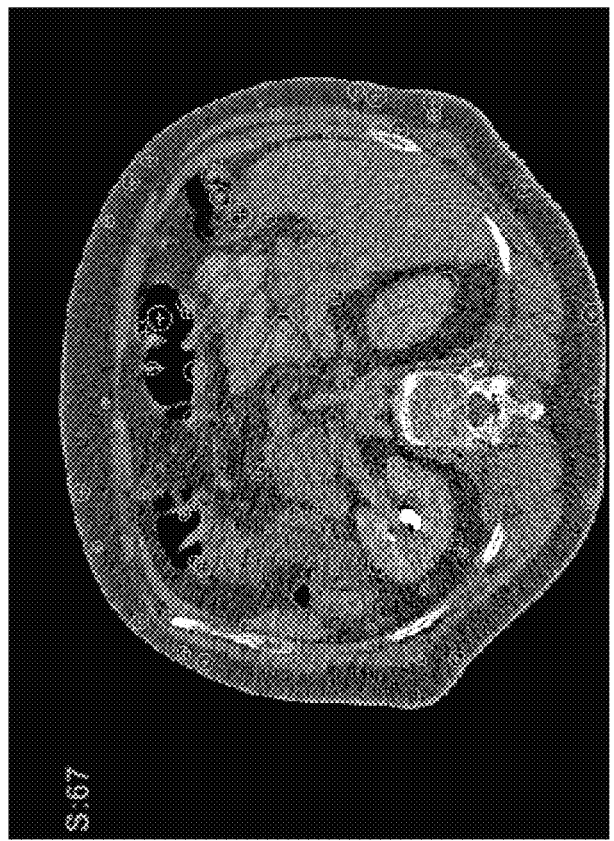
Figure 21:
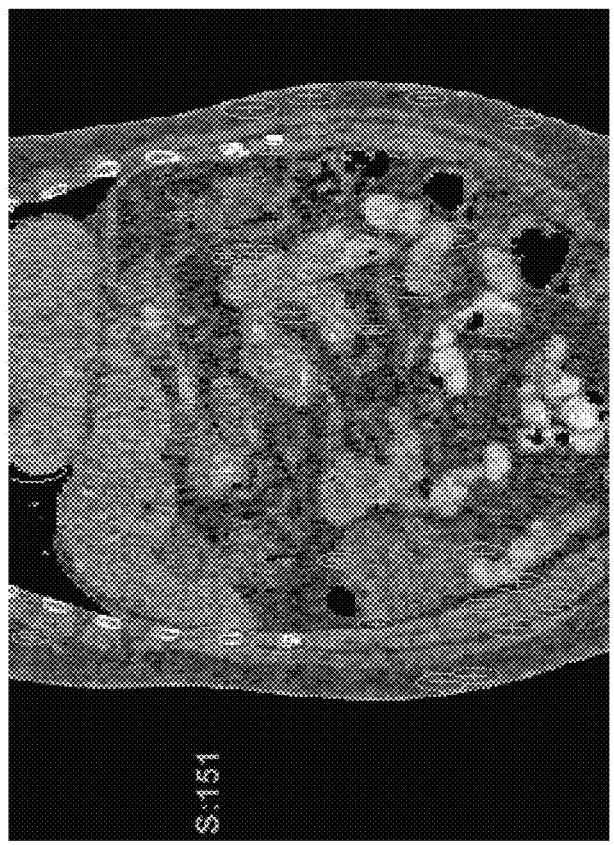
FIG. 21 is a pair of coronal view images with detected feature pairs overlaid onto each image.
Figure 21:
Figure 22:
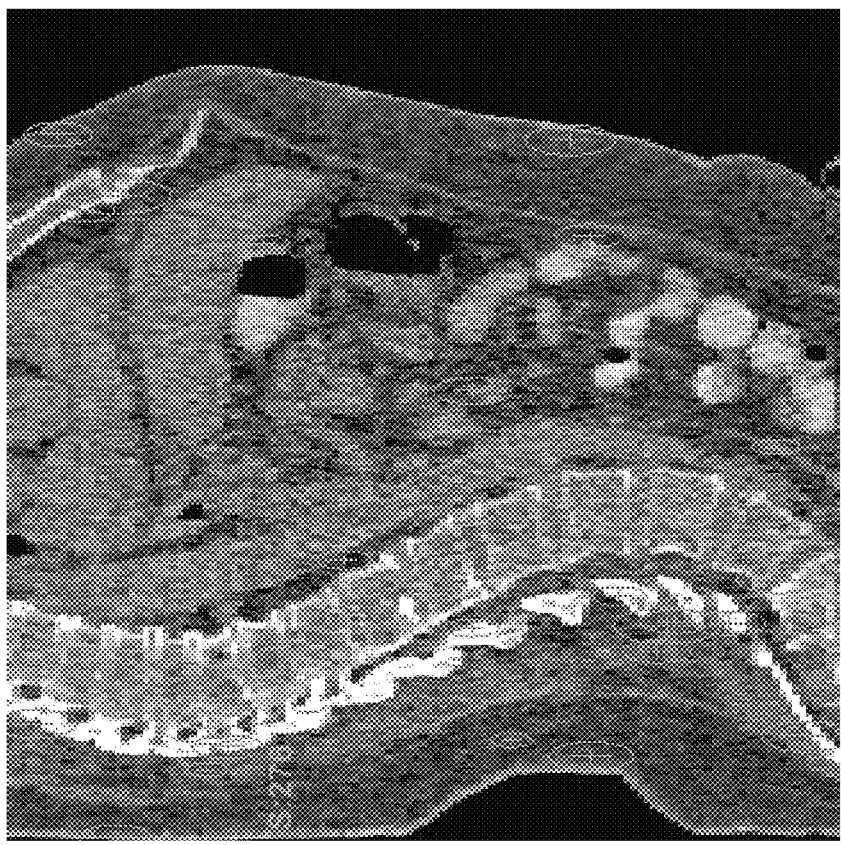
FIG. 22 is a pair of sagittal view images with detected feature pairs overlaid onto each image.
Figure 22:

In some aspects, feature detection and matching results for a first and second image may be displayed to the user by superimposing each detected feature pair onto the first and second images of the image pair. By way of non-limiting examples, the first and second images, which are axial 4DCT images obtained at EI and ET of the respiratory cycle, with superimposed circles representing the positions of the detected feature pairs, are shown in FIG. 20. FIG. 21 illustrates a coronal view of the images and detected feature pairs of FIG. 20. FIG. 22 illustrates a sagittal view of the images and detected feature pairs of FIG. 20. A maximal respiratory motion magnitude may be measured by the distance between the matched feature pairs. In some aspects, significant quantities of feature pairs may be determined and located on organs and other soft tissues positioned inside a ventral cavity. These feature pairs located on soft tissues and organs may function as landmarks for estimating organ respiratory motion suitable for use in verifying and/or calibrating deformable image registration on the organs and soft tissues, or for use in verifying or calibrating any other image-based medical diagnosis and evaluation methods without limitation.

Figure 23:
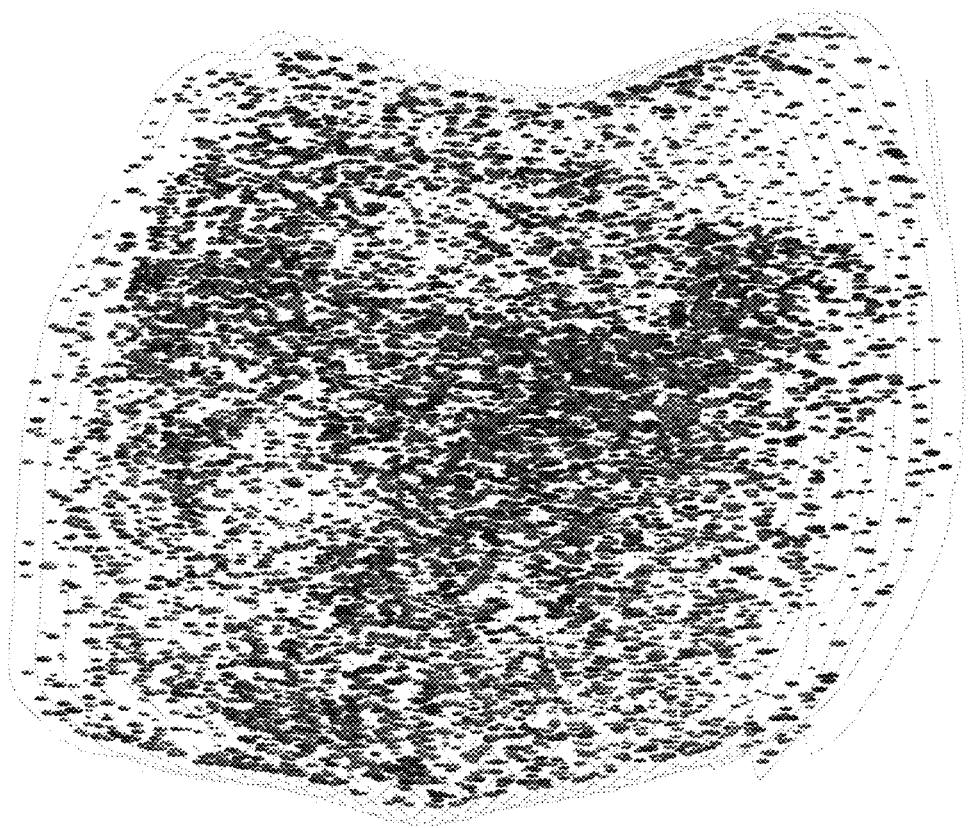
FIG. 23 is an image of a 3D map of 10477 feature pairs detected from a pair of CT images obtained at end-of-inhale and end-of-exhale stages, in which the map corresponds to the end-of-inhale phase.
Figure 24:
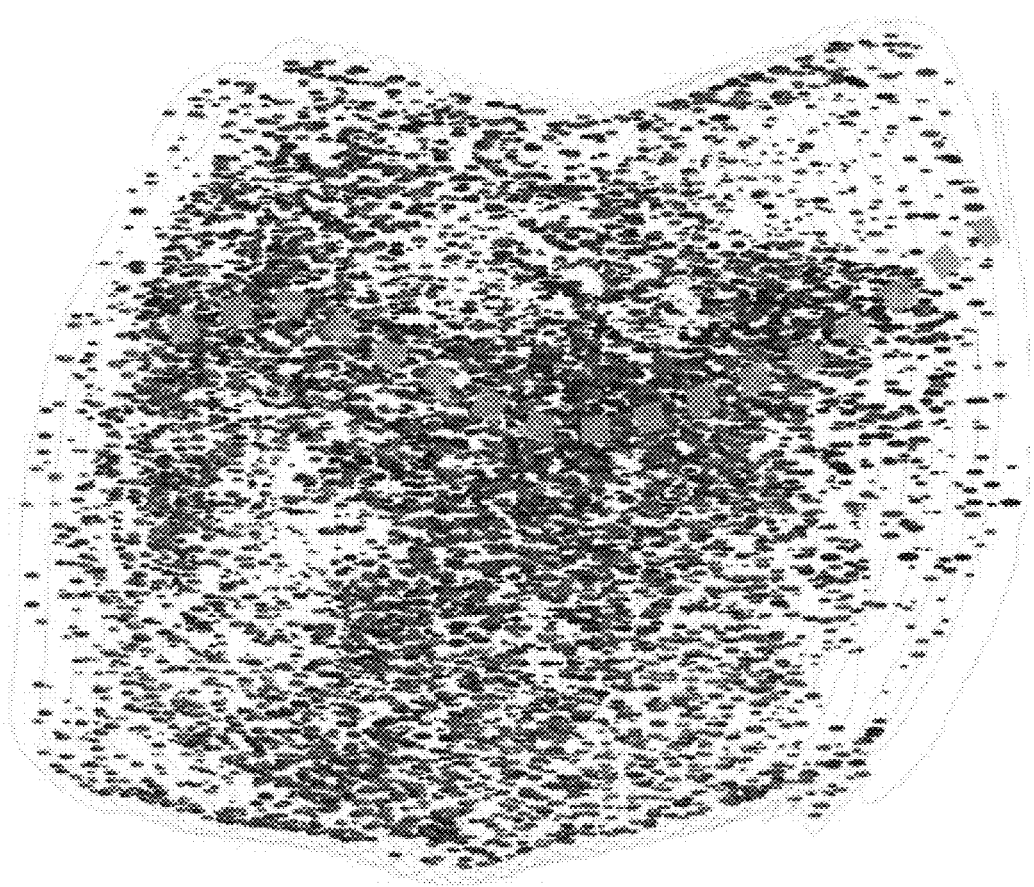
FIG. 24 is an image of the 3D map of FIG. 23, in which the map corresponds to the end-of-exhale phase.

In another aspect, the feature detection and matching results for a first and second image may be displayed to the user in the form of a 3D map of the identified features viewable by the user from any selectable vantage point. By way of non-limiting example, FIG. 23 and FIG. 24 are 3D maps of feature pairs detected from 4DCT images of an abdominal section obtained at the EI and EE phases, respectively. As illustrated in FIG. 23 and FIG. 24, numerous feature pairs may be detected and rendered in this other aspect. In some aspects, feature pairs are uniformly detected across the CT volume. In other aspects, feature pairs in relatively higher density may be detected in the vicinity of relatively stable biological structures, including, but not limited to vertebrae, pelvic girdle bones, other axial skeletal structures, skull bones, and any other relatively stable biological structures without limitation. Without being limited to any particular theory, a relatively higher number of features are detected along the vertebrae because stable bones with complicated shapes, such as vertebra, have a higher number of image features.

The method disclosed above overcomes at least one or more of the shortcomings of existing feature matching methods including, but not limited to: the quantity of features detected in each 3D medical image numbering in the tens of thousands; unstable and unrepeatable analysis of two images due to image noise, tissue motion, postural and anatomical changes; and large amounts of features with high similarity and difficulty with differentiation solely based on feature descriptors.

In various aspects, the method disclosed above enables accurate detection of large quantity of landmarks in patient image datasets. In various aspects, the disclosed method may utilize 3D implementations of SIFT and Harris-Laplacian algorithms and a multi-resolution guided inverse consistent matching method (MRGICM). In various aspects, the methods described may be further optimized for certain types of applications or image modalities. In some aspects, the disclosure may be modified for cone-beam CT images. Further, MRGICM may be modified to provide for the use of other representations of medical images including, but not limited to, anisotropic image voxels. Additionally, certain aspects of the method may further include alternate hardware configurations including, but not limited to, GPU acceleration and any other suitable hardware modification without limitation. In some aspects, temporary results may be shared between the sampling stages to reduce certain repetitive computations.

The computer systems and computer-implemented methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local or remote processors, transceivers, servers, and/or sensors (such as processors, transceivers, servers, and/or sensors mounted on vehicle or mobile devices, or associated with smart infrastructure or remote servers), and/or via computer executable instructions stored on non-transitory computer-readable media or medium.

In some aspects, a feature pair detection (FPD) computing device is configured to implement machine learning, such that the FPD computing device "learns" to analyze, organize, and/or process data without being explicitly programmed. Machine learning may be implemented through machine learning (ML) methods and algorithms. In one aspect, a machine learning (ML) module is configured to implement ML methods and algorithms. In some aspects, ML methods and algorithms are applied to data inputs and generate machine learning (ML) outputs. Data inputs may include but are not limited to: images or frames of a video, a manual or computer generated delineation of the shape of an object depicted in a frame, control conditions, matching parameters, patient data, and diagnostics data. Data inputs may further include: sensor data, image data, video data, telematics data, authentication data, authorization data, security data, mobile device data, geolocation information, transaction data, personal identification data, financial data, usage data, weather pattern data, "big data" sets, and/or user preference data. ML outputs may include but are not limited to: a tracked shape output, categorization of an object, categorization of a type of motion, a diagnosis based on motion of an object, motion analysis of an object, and trained model parameters ML outputs may further include: speech recognition, image or video recognition, medical diagnoses, statistical or financial models, autonomous vehicle decision-making models, robotics behavior modeling, fraud detection analysis, user recommendations and personalization, game AI, skill acquisition, targeted marketing, big data visualization, weather forecasting, and/or information extracted about a computer device, a user, a home, a vehicle, or a party of a transaction. In some aspects, data inputs may include certain ML outputs.

In some aspects, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, dimensionality reduction, and support vector machines. In various aspects, the implemented ML methods and algorithms are directed toward at least one of a plurality of categorizations of machine learning including, but not limited to, supervised learning, unsupervised learning, and reinforcement learning.

In one aspect, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function which maps outputs to inputs and utilize the predictive function to generate ML outputs based on data inputs. The example inputs and example outputs of the training data may include any of the data inputs or ML outputs described above. For example, a ML module may receive training data comprising customer identification and geographic information and an associated customer category, generate a model which maps customer categories to customer identification and geographic information, and generate a ML output comprising a customer category for subsequently received data inputs including customer identification and geographic information.

In another aspect, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship. In one aspect, a ML module receives unlabeled data comprising customer purchase information, customer mobile device information, and customer geolocation information, and the ML module employs an unsupervised learning method such as "clustering" to identify patterns and organize the unlabeled data into meaningful groups. The newly organized data may be used, for example, to extract further information about a customer's spending habits.

In yet another aspect, ML methods and algorithms are directed toward reinforcement learning, which involves optimizing outputs based on feedback from a reward signal. Specifically ML methods and algorithms directed toward reinforcement learning may receive a user-defined reward signal definition, receive a data input, utilize a decision-making model to generate a ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In one aspect, a ML module implements reinforcement learning in a user recommendation application. The ML module may utilize a decision-making model to generate a ranked list of options based on user information received from the user and may further receive selection data based on a user selection of one of the ranked options. A reward signal may be generated based on comparing the selection data to the ranking of the selected option. The ML module may update the decision-making model such that subsequently generated rankings more accurately predict a user selection.

As will be appreciated based upon the foregoing specification, the above-described aspects of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed aspects of the disclosure. The computer-readable media may be, for example, but is not limited to, a fixed (hard) drive, diskette, optical disk, magnetic tape, semiconductor memory such as read-only memory (ROM), and/or any transmitting/receiving medium including, but not limited to, the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one aspect, a computer program is provided, and the program is embodied on a computer readable medium. In one aspect, the system is executed on a single computer system, without requiring a connection to a sever computer. In a further aspect, the system is being run in a Windows® environment (Windows is a registered trademark of Microsoft Corporation, Redmond, Wash.). In yet another aspect, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some aspects, the system includes multiple components distributed among a plurality of computing devices. One or more components may be in the form of computer-executable instructions embodied in a computer-readable medium. The systems and processes are not limited to the specific aspects described herein. In addition, components of each system and each process can be practiced independent and separate from other components and processes described herein. Each component and process can also be used in combination with other assembly packages and processes. The present aspects may enhance the functionality and functioning of computers and/or computer systems.

As used herein, "frame" is used to refer to an image, an image or frame within a series of images or frames, or a still image or frame of a video. As used herein, "video" is used to refer to a video or a series of images or frames.

The patent claims at the end of this document are not intended to be construed under 35 U.S.C. § 112(f) unless traditional means-plus-function language is expressly recited, such as "means for" or "step for" language being expressly recited in the claim(s).

EXAMPLE

The following non-limiting example is provided to further illustrate the present disclosure. It should be appreciated by those of skill in the art that the techniques disclosed in the example that follows represents approaches the inventors have found function well in the practice of the present disclosure, and thus can be considered to constitute an examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1: Detection of Landmark Pairs

To validate the method of detecting landmarks from image pairs as disclosed above, the following experiments were conducted.

Image datasets from a total of 7 patients (3 abdominal 4DCT, 2 head-neck planning CT, and 2 pelvis fractional MRI datasets), acquired during standard patient cancer treatments were retrospectively obtained from the clinical treatment systems and de-identified. The image datasets used for these experiments are summarized in Table 2 below. These three types of image datasets were selected because tissue motion was predicted to be significant between each of the two images in each image pair and the motion magnitudes would typically post challenges to most existing DIR algorithms.

TABLE 2

Patient image datasets

| Image Type | N | In-Plane Resolution (mm) | Slice Thickness (mm) |
| --- | --- | --- | --- |
| Abdominal 4DCT | 3 | 0.9866-1.2 | 3 |
| Head-neck planning CT | 2 | 0.9866-1.2 | 3 |
| Pelvis fractional MRI | 2 | 1.5 | 1.5 |

The full image datasets of 4DCT images were acquired using the respiratory phase re-binning method and reconstructed in 10 respiration phases. Only the end-of-inhale and the end-of-exhale phases were analyzed in these experiments because tissue motion is most pronounced between these two phases. The head-neck planning CT datasets were obtained from patients who were rescanned in different setups during the course of radiation treatment; the initial simulation CT and the rescan simulation CT datasets were both included in these datasets. The MRI datasets were obtained from patients who received the MRI guided adaptive radiation therapy on the MRIdian (Viewray, Oakwood Village, Ohio, USA) treatment machine.

For each CT image, the skin surface was detected by thresholding the image at HU=−700 on each 2D axial slice and filling any holes in the images with a morphologic flood fill filter. All voxels outside the skin mask were set to 0 in order to avoid feature detection on the noise voxels outside the body. The CT images were cropped in the axial plane to remove image content associated with the CT couch table and excessive empty space outside the skin mask. The cropped CT images were de-noised using a 3D bilateral filter with the distance sigma=1 and intensity sigma=20.

Similar preprocessing steps were applied for each MR image. A thresholding value=20 was used for skin surface detection. The distance sigma=1 and the intensity sigma=5 were used in the 3D bilateral de-noising filter.

Enhance the number of features detected in each patient image pair, a 3D SIFT feature detector and a 3D Harris-Laplacian corner detector was used. Preliminary results (not shown) confirmed that these two feature point detection methods worked complementarily and detected different features. A custom version of a 3D SIFT method was used with the various enhancements: rejection of any feature points positioned outside the skin mask; iterative refinement of the point position and scale in the 4D DOG space based on the 4D image gradient; rejection of any points on the edges and in low contrast regions, based on the ratios of eigenvalues of the structural tensor matrix per point; and removal of the duplicated points, defined as any points within 1 voxel distance from other detected points. Parameters of the 3D SIFT algorithm used in these experiments are provided in Table 1.

In these experiments, four resolution stages were to identify landmark points, as described above, corresponding to the 100%, ½, ¼ and ⅛ of the original image resolution. Gaussian pyramid half-sampling filter was successively applied to the 100%, ½, and ¼ resolution images to obtain the image resolutions used for the four stages of landmark detection.

To verify the proposed multi-resolution guided inverse consistent matching (MRGICM) method, a digital phantom dataset with ground truth landmarks was generated as described below.

The deformation vector field (DVF) was computed between the end-of-inhale (EI) phase and the end-of-exhale (EE) phase for one of the abdominal 4DCT image datasets using the Horn-Schunck deformable image registration (DIR) algorithm in the MATLAB deformable image registration toolkit DIRART with 5 multi-resolution stages, in-iteration smoothing setting=3, between-pass smoothing setting=3, the number of passes=9 for each stage, and the number of iterations=20 for every pass and every stage. A deformed EI image, denoted as $I_{DM}$, was computed using the DVF. The undeformed EI image was shifted by 1.5 pixels in both X and Y directions in the axial plane using trilinear interpolation to form a shifted and slightly smoothed version of the image, denoted as $I_M$. The $I_M$ image included additional displacement to enhance the challenge for feature detection and matching, as well as adding differences in image smoothing resulting from the trilinear interpolation.

This digital phantom dataset obtained as described above contained the two images $I_M$, $I_{DM}$ and the known voxel mapping between $I_M$ and $I_{DM}$ (DVF computed by DIR+the 1.5 pixel shifts). The DVF applied was computed between EI and EE using DIR, and was more realistic than a synthesized DVF. The DIR results are shown in FIG. 12, FIG. 13, FIG. 14, FIG. 15, FIG. 16, and FIG. 17. From the difference images before and after DIR, the results indicate that DIR performed well. The deformation was detected mainly inside the ventral cavity. There was minimal deformation observed on and outside the rib cage, and on the vertebrae.

$I_M$ and $I_{DM}$, both computed from EI, were applied in the feature detection and matching procedures disclosed above.

procedure was adopted to speed up the manual evaluation process: 1) detected landmark pairs were sorted according to the overall matching confidence, from low to high, 2) landmark pairs were manually verified one by one starting from the landmark pairs at the lowest confidence, 3) if there were no errors for 20 consecutive pairs, the remaining landmark pairs were checked at an interval of 5, then 10, then 20, and 4) if a new error was found for a landmark pair were checked, the interval of checking was reduced. This process allowed the low confidence landmark pairs to be checked carefully one by one and the high confidence pairs to be checked quickly.

Thea accuracies of three feature matching methods were assessed using the ground truth datasets described above. The three feature matching methods were the method described above (finding the best matching feature by testing the dot-product of two feature descriptors), the method described above plus inverse-consistency analysis, also described above (to run the regular method in both matching directions and to reject the inconsistent results), or simply denoted as the IC method, and the proposed multi-resolution guided inverse consistent matching (MRGICM) method.

TREs were computed as the displacement between the matched feature points from two images and the ground truth DVF. Any feature pairs with a Target Registration Error (TRE)>6 mm were considered a matching error. A 6 mm threshold is chosen as it doubles the image slice thickness of 3 mm.

The performance evaluation results using seven digital phantom datasets are summarized in Table 3 below. There were a total of 82,987 pairs of features detected or 11,855 on average per dataset. Numbers of feature pairs detected by the regular and IC methods were within 0.5% respectively by manually configuring the descriptor matching threshold $t_1$ (see Table 1). TREs were computed per feature pair against the ground truth DVFs and analyzed using student t-tests. The TREs on feature pairs detected by MRICGM were significantly smaller than TREs obtained by the other two matching methods (P<<0.001).

| Case # | Image Type | # of Feature pairs detected[a] | Ground truth DVF[b] (mm) | TRE (MRICGM) (mm) | TRE (regular) (mm) | TRE (IC[c]) (mm) |
|---|---|---|---|---|---|---|
| 1 | 4DCT | 21472 | 1.67 ± 2.08 | 0.65 ± 0.60 | 1.10 ± 2.95 | 0.83 ± 1.73 |
| 2 | 4DCT | 15180 | 4.13 ± 4.71 | 0.78 ± 0.72 | 1.61 ± 3.89 | 1.16 ± 2.70 |
| 3 | 4DCT | 28203 | 4.2 ± 4.55 | 0.74 ± 0.68 | 1.35 ± 3.49 | 0.96 ± 2.16 |
| 4 | H/N CT | 2038 | 2.98 ± 1.94 | 1.29 ± 1.18 | 2.28 ± 3.30 | 1.75 ± 2.56 |
| 5 | H/N CT | 910 | 1.95 ± 1.52 | 1.19 ± 1.69 | 1.66 ± 2.58 | 1.30 ± 2.06 |
| 6 | Pelvis MRI | 4648 | 5.96 ± 2.50 | 1.05 ± 1.02 | 2.33 ± 4.17 | 1.92 ± 3.23 |
| 7 | Pelvis MRI | 10545 | 1.25 ± 1.21 | 0.85 ± 0.79 | 1.85 ± 3.59 | 1.33 ± 2.32 |
| Avg | | 11855 | 3.20 ± 3.30 | 0.77 ± 0.72 | 1.48 ± 3.46 | 1.09 ± 2.23 |

TRE, Target Registration Error.
[a] The listed numbers of feature pairs were detected by MRICGM. Numbers of feature pairs detected by the regular and IC methods were within 0.5%, respectively.
[b] The ground truth DVF (positional displacement) between the matched feature pairs.
[c] IC = regular + inverse consistency.

For any feature point detected in either image, the ground truth corresponding coordinates in the other image could be precisely computed using the known voxel mapping between $I_M$ and $I_{DM}$.

Figure 18:
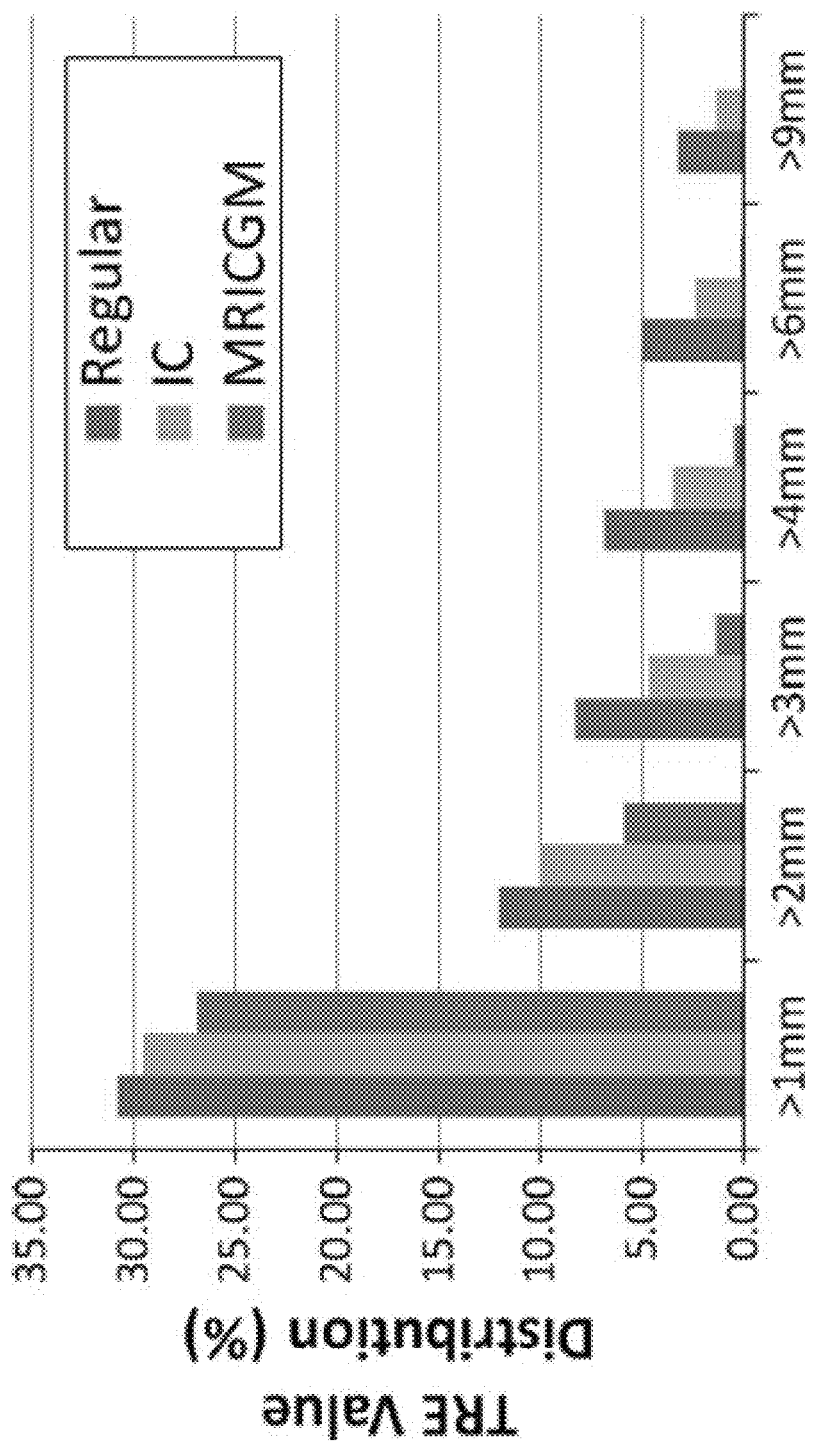
FIG. 18 is a graph comparing feature matching accuracy of several matching methods.
Figure 19:
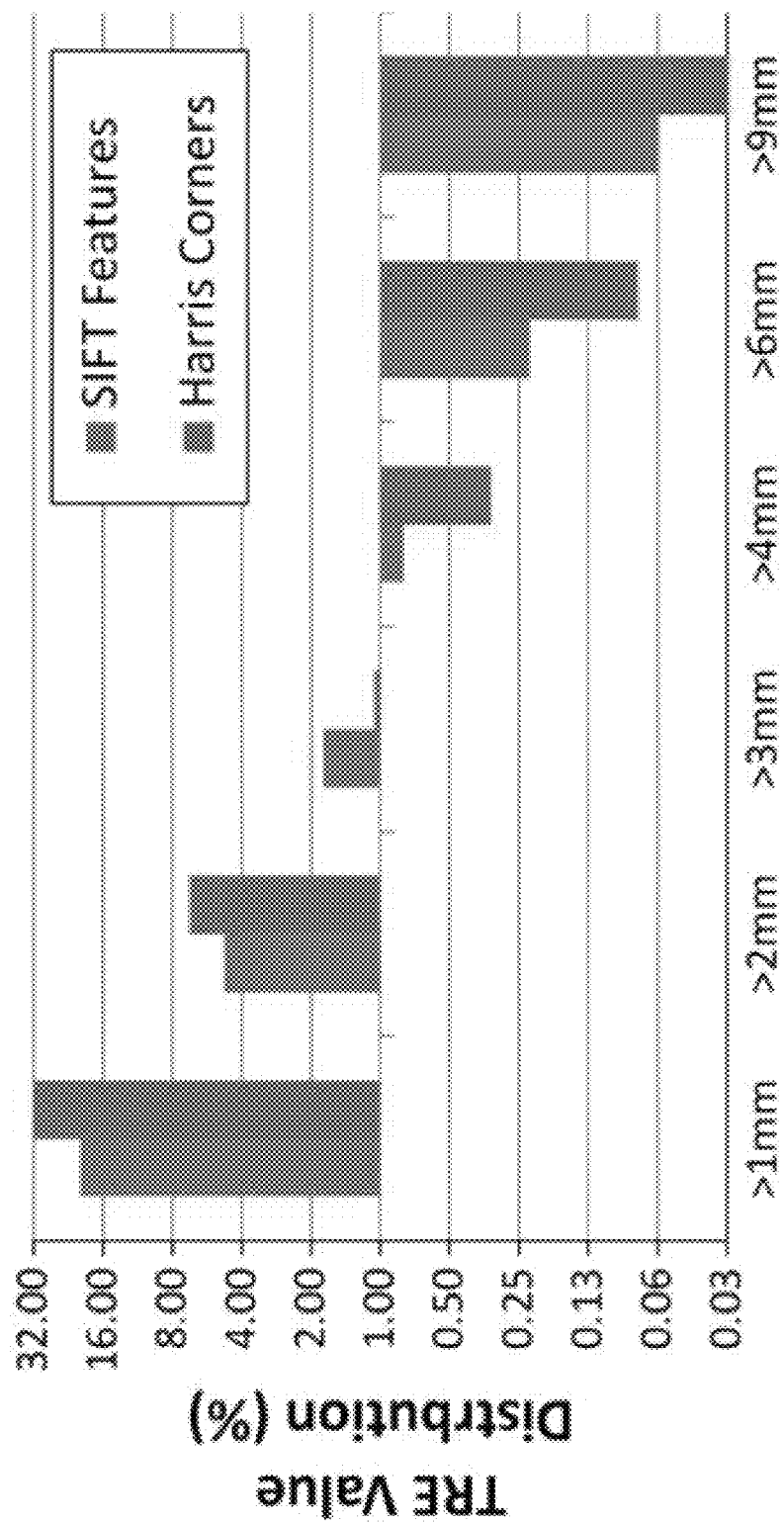
FIG. 19 is a graph comparing TRE magnitudes of 22000 feature pairs detected using several matching methods.

The seven patient image datasets listed in Table 2 were also analyzed using the methods disclosed above. The detected landmark pairs for each patient dataset were manually evaluated by at least 2 observers. Because thousands of landmark pairs were detected in each case, the following FIG. 18 and FIG. 19 summarize the matching accuracy comparison. FIG. 18 shows the comparison of histograms of all TRE values measured by the regular, IC, and MRICGM methods on the seven digital phantom datasets. MRICGM outperformed the other two methods. 1.35% of feature pairs obtained by MRICGM have TRE>3 mm, and 0.52% have TREs>4 mm. In comparison, the respective values are 8.33% and 6.89% for the regular method, and 4.17% and 3.49% for the IC method. FIG. 19 shows the comparison of TRE values for all 38821 SIFT feature pairs and 53992 Harris corner pairs measured by MRICGM on seven digital phantom datasets. More corner features were detected than SIFT features. The average positional accuracy with SIFT features (TREs=0.67±0.74 mm) were greater than that with the corner features (TREs=0.85±0.68 mm), probably due to the iterative position refinement step described above in association with the SIFT detection algorithm. Sub-voxel positional accuracy was achieved using the SIFT features. In comparison, the positions of the corner feature detected by the Harris-Laplacian method are limited to whole-voxel resolution. Fewer percentages of Harris corners had larger TREs, e.g., TREs>3 mm. This suggests Harris corners were more robust, even though the positions were less accurate, than SIFT features. Consequently, a combination of SIFT feature detection and Harris-Laplacian corner detection methods detected more features relative to SIFT.

In view of the above, it will be seen that the several advantages of the disclosure are achieved and other advantageous results attained. As various changes could be made in the above methods and systems without departing from the scope of the disclosure, it is intended that all matter contained in the above description and shown in the accompanying drawings shall be interpreted as illustrative and not in a limiting sense.

When introducing elements of the present disclosure or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A computer-implemented method for detecting landmark pairs in a pair of full-resolution images, the method implemented using at least one processor in communication with at least one memory, the method comprising:
   down-sampling, using the at least one processor, the pair of full-resolution images to generate a reduced-resolution pair of images, the reduced-resolution pair of images comprising an image resolution less than a corresponding resolution of the pair of full-resolution images;
   detecting, using the at least one processor, a plurality of features in the reduced-resolution pair of images;
   determining, using the at least one processor, in the reduced-resolution pair of images:
      a plurality of matched feature pairs in a first iteration comprising unguided feature matching; and
      at least one additional plurality of matched feature pairs in at least one additional iteration comprising guided feature matching with a plurality of guide pairs selected from the plurality of matched feature pairs and at least one additional plurality of matched feature pairs from previous iterations; and
   determining, using the at least one processor, in the full-resolution pair of images, a plurality of landmark pairs in at least one iteration comprising guided feature matching with a plurality of guide pairs selected from the plurality of matched feature pairs and the at least one additional plurality of matched feature pairs.

2. The method of claim 1, wherein the first iteration to determine the plurality of matched feature pairs uses a first matching threshold and each additional iteration of the at least one additional iteration to determine the at least one additional plurality of matched feature pairs uses an additional matching threshold, wherein the first matching threshold is higher than the additional matching threshold.

3. The method of claim 1, wherein each iteration of the at least one additional iteration to determine the plurality of matched feature pairs uses a matching threshold that is lower than a prior matching threshold used for a prior additional iteration of the at least one additional iteration to determine the at least one additional plurality of matched feature pairs.

4. The method of claim 1 further comprising preprocessing the pair of full-resolution images, the preprocessing comprising creating a skin mask, removing voxels outside the skin mask, and applying a 3D bilateral filter to remove noise from the pair of full-resolution images.

5. The method of claim 1 further comprising down-sampling the reduced-resolution pair of images to generate an additional reduced-resolution pair of images, the additional reduced-resolution pair of images comprising an image resolution less than a corresponding resolution of the reduced-resolution pair of images.

6. The method of claim 5, wherein down-sampling is performed using a sampling filter.

7. The method of claim 1, wherein identifying a plurality of features in the reduced-resolution pair of images comprises at least one of using a 3D SIFT algorithm to detect SIFT features, using a 3D Harris-Laplacian algorithm to detect corner features, and computing SIFT descriptors for the SIFT features and corner features.

8. The method of claim 1, wherein determining a plurality of landmark pairs in the pair of full-resolution images further comprises inverse-consistent matching of the full-resolution pair of images.

9. The method of claim 1 further comprising generating a SIFT descriptor for each feature of the plurality of features.

10. The method of claim 9 further comprising extracting and processing voxel information around a feature point to generate the SIFT descriptor.

11. A feature pair detection (FPD) computing device for detecting landmark pairs in a pair of full-resolution images, the FPD computing device including at least one processor in communication with at least one memory device, the at least one processor programmed to:
   down-sample the pair of full-resolution images to generate a reduced-resolution pair of images, the reduced-resolution pair of images comprising an image resolution less than a corresponding resolution of the pair of full-resolution images;
   detect a plurality of features in the reduced-resolution pair of images;
   determine, in the reduced-resolution pair of images:
      a plurality of matched feature pairs in a first iteration comprising unguided feature matching; and
      at least one additional plurality of matched feature pairs in at least one additional iteration comprising guided feature matching with a plurality of guide pairs selected from the plurality of matched feature pairs and at least one additional plurality of matched feature pairs from previous iterations; and
   determine, in the full-resolution pair of images, a plurality of landmark pairs in at least one iteration comprising guided feature matching with a plurality of guide pairs selected from the plurality of matched feature pairs and the at least one additional plurality of matched feature pairs.

12. The FPD computing device of claim 11, wherein the first iteration to determine the plurality of matched feature pairs uses a first matching threshold and each additional iteration of the at least one additional iteration to determine the at least one additional plurality of matched feature pairs uses an additional matching threshold, wherein the first matching threshold is higher than the additional matching threshold.

13. The FPD computing device of claim 11, wherein each additional iteration of the at least one additional iteration to determine the plurality of matched feature pairs uses a matching threshold that is lower than a prior matching threshold used for a prior additional iteration of the at least one additional iteration to determine the at least one additional plurality of matched feature pairs.

14. The FPD computing device of claim 11, wherein the at least one processor is further configured to preprocess the pair of full-resolution images by creating a skin mask, removing voxels outside the skin mask, and applying a 3D bilateral filter to remove noise from the pair of full-resolution images.

15. The FPD computing device of claim 11, wherein the at least one processor is further configured to sample the reduced-resolution pair of images to generate an additional reduced-resolution pair of images, the additional reduced-resolution pair of images having a resolution of half the resolution of the reduced-resolution pair of images.

16. The FPD computing device of claim 15, wherein the at least one processor is further configured to down-sample by applying a sampling filter.

17. The FPD computing device of claim 11, wherein the at least one processor is further configured to identify the plurality of features in the reduced-resolution pair of images using at least one of detecting SIFT features by applying a 3D SIFT algorithm, detecting corner features using a 3D Harris-Laplacian algorithm, and computing SIFT descriptors for the SIFT features and the corner features.

18. At least one non-transitory computer-readable storage medium having computer-executable instructions for implementing a feature pair detection (FPD) program embodied thereon, wherein when executed by a feature pair detection computing device including at least one processor in communication with at least one memory, the computer-executable instructions cause the at least one processor to:

down-sample a pair of full-resolution images to generate a reduced-resolution pair of images, the reduced-resolution pair of images comprising an image resolution less than a corresponding resolution of the pair of full-resolution images;

detect a plurality of features in the reduced-resolution pair of images;

determine, in the reduced-resolution pair of images:
        a plurality of matched feature pairs in a first iteration comprising unguided feature matching; and
        at least one additional plurality of matched feature pairs in at least one additional iteration comprising guided feature matching with a plurality of guide pairs selected from the plurality of matched feature pairs and at least one additional plurality of matched feature pairs from previous iterations; and determine, in the full-resolution pair of images, a plurality of landmark pairs in at least one iteration comprising guided feature matching with a plurality of guide pairs selected from the plurality of matched feature pairs and the at least one additional plurality of matched feature pairs.

19. The at least one non-transitory computer-readable storage medium of claim 18, wherein the first iteration to determine the plurality of matched feature pairs uses a first matching threshold and each additional iteration of the at least one additional iteration to determine the at least one additional plurality of matched feature pairs uses an additional matching threshold, wherein the first matching threshold is higher than the additional matching threshold.

20. The at least one non-transitory computer-readable storage medium of claim 18, wherein each iteration of the at least one iterations to determine the plurality of matched feature pairs uses a matching threshold that is lower than a prior matching threshold used for a prior iteration of the at least one iterations to determine the at least one additional plurality of matched feature pairs.

\* \* \* \* \*